US012676534B2

(12) United States Patent
Minkebige et al.

(10) Patent No.: US 12,676,534 B2
(45) Date of Patent: Jul. 7, 2026

(54) CONCRETE VIBRATOR SYSTEM

(71) Applicant: MILWAUKEE ELECTRIC TOOL CORPORATION, Brookfield, WI (US)

(72) Inventors: Carissa J. Minkebige, Lake Mills, WI (US); Evan M. Glanzer, Milwaukee, WI (US); Joseph W. Miller, Waukesha, WI (US); Rohit Vaidya, Menomonee Falls, WI (US); Erich G. Thuer, Menomonee Falls, WI (US); Katherine A. Flaherty, Brookfield, WI (US); Gabriel Martinez, Torreon (MX); Soren Z. Champan-Aldridge, Kenosha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 212 days.

(21) Appl. No.: 18/359,970

(22) Filed: Jul. 27, 2023

(65) Prior Publication Data

US 2024/0039371 A1    Feb. 1, 2024

Related U.S. Application Data

(60) Provisional application No. 63/386,733, filed on Dec. 9, 2022, provisional application No. 63/392,615, filed on Jul. 27, 2022.

(51) Int. Cl.
H02K 11/30 (2016.01)
H02P 29/60 (2016.01)
(52) U.S. Cl.
CPC .............. H02K 11/30 (2016.01); H02P 29/60 (2016.02)

(58) Field of Classification Search
CPC ....................................................... H02K 11/30
(Continued)

(56) References Cited

U.S. PATENT DOCUMENTS 2,116,708 A    5/1938    Niekamp
2,198,148 A    4/1940    Baily
(Continued)

FOREIGN PATENT DOCUMENTS

CN    2045008 U    9/1989
CN    2057438 U    5/1990
(Continued)

OTHER PUBLICATIONS

Ryobi, "40V Backpack Power Supply/Charger," <https://www.ryobitools.com/products/details/46396040299> web page visited Jul. 28, 2023 (15 pages).
(Continued)

*Primary Examiner* — Jose A Gonzalez Quinones
(74) *Attorney, Agent, or Firm* — Michael Best & Friedrich LLP

(57)    ABSTRACT

A concrete vibrator system comprises a vibrating head including a shaft. The shaft has a center of mass that is radially offset from a rotational axis of the shaft. The vibrating head also includes an onboard electric motor configured to provide torque to the shaft, causing the shaft to rotate. The concrete vibrator system further comprises a portable power unit including a battery pack configured to provide electrical current to the motor. A cable extends between the portable power unit and the vibrating head. The cable is configured to transmit electrical current from the battery pack to the motor and a motor control signal from the portable power unit to the motor.

25 Claims, 23 Drawing Sheets

(58) Field of Classification Search
USPC ......................................................... 310/15
See application file for complete search history.

(56) References Cited

U.S. PATENT DOCUMENTS

| | | | |
|---|---|---|---|
| 2,808,238 | A | 10/1957 | Spitler |
| 2,945,970 | A | 7/1960 | Nordegren |
| 2,966,804 | A | 1/1961 | McCarthy |
| 3,410,528 | A | 11/1968 | Clark et al. |
| 3,784,168 | A | 1/1974 | Schneider et al. |
| 3,961,774 | A | 6/1976 | Strohbeck et al. |
| 4,199,264 | A | 4/1980 | Uebel |
| 5,202,612 | A | 4/1993 | Yoshida et al. |
| 6,084,327 | A | 7/2000 | Steffen |
| 6,223,871 | B1 | 5/2001 | Steffen |
| 6,619,832 | B1 | 9/2003 | Steffen |
| 6,733,169 | B2 | 5/2004 | Steffen |
| 6,735,066 | B2 | 5/2004 | Steffen |
| 6,808,384 | B1 | 10/2004 | Jordan et al. |
| 6,960,013 | B2 | 11/2005 | Steffen et al. |
| 7,044,413 | B2 | 5/2006 | Steffen |
| 7,345,561 | B2 | 3/2008 | Meyer et al. |
| 7,385,315 | B2 | 6/2008 | Steffen |
| 7,498,691 | B2 | 3/2009 | Steffen |
| 7,714,686 | B2 | 5/2010 | Meyer et al. |
| 8,459,899 | B2 | 6/2013 | Pujol Artigas |
| 9,035,596 | B2 | 5/2015 | Sugiura et al. |
| 9,289,893 | B2 | 3/2016 | Reber et al. |
| 9,391,305 | B2 | 7/2016 | Yoshinari et al. |
| 9,496,536 | B2 | 11/2016 | Yoshinari et al. |
| 9,667,006 | B2 | 5/2017 | Waigel et al. |
| 9,695,605 | B2 | 7/2017 | Jin |
| 9,893,329 | B2 | 2/2018 | Sakakibara |
| 10,039,367 | B2 | 8/2018 | Yamaoka et al. |
| 10,080,418 | B2 | 9/2018 | Wagner et al. |
| 10,230,077 | B2 | 3/2019 | Rief et al. |
| 10,736,403 | B2 | 8/2020 | Yamaoka et al. |
| 10,749,430 | B2 | 8/2020 | Gao et al. |
| 10,892,449 | B2 | 1/2021 | Yamaoka et al. |
| 10,892,626 | B2 | 1/2021 | Rief et al. |
| 10,907,366 | B2 | 2/2021 | Suzuki et al. |
| 10,998,596 | B2 | 5/2021 | Zhang et al. |
| 11,601,002 | B2 | 3/2023 | Gao et al. |
| 11,641,120 | B2 | 5/2023 | Okuoka et al. |
| 2004/0144188 | A1 | 7/2004 | Steffen |
| 2008/0012165 | A1 | 1/2008 | Kunze et al. |
| 2014/0009857 | A1 | 1/2014 | Suzuki |
| 2015/0042280 | A1 | 2/2015 | Rief et al. |
| 2015/0044519 | A1 | 2/2015 | Rief et al. |
| 2015/0050531 | A1 | 2/2015 | Felser et al. |
| 2015/0050532 | A1 | 2/2015 | Waigel et al. |
| 2015/0188332 | A1 | 7/2015 | Nakano et al. |
| 2015/0194646 | A1 | 7/2015 | Yoshinari et al. |
| 2015/0194647 | A1 | 7/2015 | Yoshinari et al. |
| 2016/0260942 | A1 | 9/2016 | Wagner et al. |
| 2016/0270458 | A1 | 9/2016 | Conrad et al. |
| 2019/0006980 | A1* | 1/2019 | Sheeks .............. H01M 10/4207 |
| 2020/0037735 | A1 | 2/2020 | Steffen et al. |
| 2020/0113317 | A1 | 4/2020 | Okumi et al. |
| 2020/0253360 | A1 | 8/2020 | Hahn et al. |
| 2021/0148126 | A1* | 5/2021 | Gallagher ............... E04G 21/08 |
| 2021/0226288 | A1 | 7/2021 | Zhang et al. |
| 2021/0246079 | A1 | 8/2021 | Shi et al. |
| 2021/0267357 | A1 | 9/2021 | Steffen et al. |
| 2022/0190617 | A1 | 6/2022 | Roberts |
| 2022/0336895 | A1 | 10/2022 | Ogura |
| 2023/0110242 | A1 | 4/2023 | Koike |
| 2023/0111737 | A1 | 4/2023 | Koike |
| 2024/0088630 | A1 | 3/2024 | Yu et al. |

FOREIGN PATENT DOCUMENTS

| | | | |
|---|---|---|---|
| CN | 2251010 | Y | 4/1997 |
| CN | 2255471 | Y | 6/1997 |
| CN | 2288234 | Y | 8/1998 |
| CN | 2307816 | Y | 2/1999 |
| CN | 2370102 | Y | 3/2000 |
| CN | 2376371 | Y | 5/2000 |
| CN | 2391948 | Y | 8/2000 |
| CN | 2527629 | Y | 12/2002 |
| CN | 2532177 | Y | 1/2003 |
| CN | 2625495 | Y | 7/2004 |
| CN | 2667081 | Y | 12/2004 |
| CN | 2670502 | Y | 1/2005 |
| CN | 201011134 | Y | 1/2008 |
| CN | 201502180 | U | 6/2010 |
| CN | 201714098 | U | 1/2011 |
| CN | 201850775 | U | 6/2011 |
| CN | 202042530 | U | 11/2011 |
| CN | 202559760 | U | 11/2012 |
| CN | 202706575 | U | 1/2013 |
| CN | 101912840 | B | 2/2013 |
| CN | 203347243 | U | 12/2013 |
| CN | 203347244 | U | 12/2013 |
| CN | 203862526 | U | 10/2014 |
| CN | 104563520 | A | 4/2015 |
| CN | 104695712 | A | 6/2015 |
| CN | 204435891 | U | 7/2015 |
| CN | 204626987 | U | 9/2015 |
| CN | 204876584 | U | 12/2015 |
| CN | 105978220 | A | 9/2016 |
| CN | 106121245 | A | 11/2016 |
| CN | 206360370 | U | 7/2017 |
| CN | 206360372 | U | 7/2017 |
| CN | 206360373 | U | 7/2017 |
| CN | 206530067 | U | 9/2017 |
| CN | 107338961 | A | 11/2017 |
| CN | 207273156 | U | 4/2018 |
| CN | 207409539 | U | 5/2018 |
| CN | 207409540 | U | 5/2018 |
| CN | 108336259 | A | 7/2018 |
| CN | 207597880 | U | 7/2018 |
| CN | 208009907 | U | 10/2018 |
| CN | 208158481 | U | 11/2018 |
| CN | 208618823 | U | 3/2019 |
| CN | 110499918 | A | 11/2019 |
| CN | 210421947 | U | 4/2020 |
| CN | 210598169 | U | 5/2020 |
| CN | 211007695 | U | 7/2020 |
| CN | 211369564 | U | 8/2020 |
| CN | 211429026 | U | 9/2020 |
| CN | 211666285 | U | 10/2020 |
| CN | 211949652 | U | 11/2020 |
| CN | 212743414 | U | 3/2021 |
| CN | 213087453 | U | 4/2021 |
| CN | 213584030 | U | 6/2021 |
| CN | 113162548 | A | 7/2021 |
| CN | 213742368 | U | 7/2021 |
| CN | 213927537 | U | 8/2021 |
| CN | 213953024 | U | 8/2021 |
| CN | 214411412 | U | 10/2021 |
| CN | 215184349 | U | 12/2021 |
| CN | 215498894 | U | 1/2022 |
| CN | 215722396 | U | 2/2022 |
| CN | 215993043 | U | 3/2022 |
| CN | 218604098 | U | 3/2023 |
| CN | 219534718 | U | 8/2023 |
| DE | 1913595 | U | 4/1965 |
| DE | 1920986 | U | 8/1965 |
| DE | 1684336 | B1 | 12/1971 |
| DE | 1709340 | A1 | 7/1972 |
| DE | 2349612 | A1 | 4/1975 |
| DE | 7335644 | U | 4/1975 |
| DE | 2419458 | A1 | 11/1975 |
| DE | 2421705 | A1 | 11/1975 |
| DE | 7531312 | U | 3/1977 |
| DE | 2724247 | A1 | 12/1978 |
| DE | 2748163 | A1 | 5/1979 |
| DE | 2817170 | A1 | 10/1979 |
| DE | 7930186 | U1 | 4/1981 |
| DE | 3034368 | A1 | 5/1982 |
| DE | 3320080 | A1 | 12/1984 |
| DE | 19527517 | A1 | 10/1996 |
| DE | 19900348 | A1 | 7/2000 |

(56) References Cited

FOREIGN PATENT DOCUMENTS

| | | | |
|---|---|---|---|
| DE | 19903000 | A1 | 8/2000 |
| DE | 20017054 | U1 | 1/2001 |
| DE | 10103941 | A1 | 8/2002 |
| DE | 102016105983 | A1 | 10/2017 |
| DE | 102012002166 | B4 | 1/2018 |
| DE | 102018118563 | A1 | 2/2020 |
| DE | 202020103854 | U1 | 7/2020 |
| EP | 0916785 | A1 | 5/1999 |
| EP | 0964116 | A1 | 12/1999 |
| EP | 1316655 | A1 | 6/2003 |
| EP | 1464776 | A2 | 10/2004 |
| EP | 1561881 | A1 | 8/2005 |
| EP | 2477303 | A2 | 7/2012 |
| EP | 2819207 | A1 | 12/2014 |
| EP | 3081717 | A2 | 10/2016 |
| EP | 2586572 | B1 | 3/2017 |
| EP | 3309862 | A1 | 4/2018 |
| EP | 3605785 | A1 | 2/2020 |
| EP | 3716742 | A1 | 9/2020 |
| EP | 3605784 | B1 | 3/2023 |
| JP | 2019019530 | A * | 2/2019 |
| JP | 2019206910 | A * | 12/2019 |

| | | | | | |
|---|---|---|---|---|---|
| KR | 20140071670 | A | * | 6/2014 | ............... H02P 6/16 |
| WO | WO0024114 | A1 | | 4/2000 | |
| WO | WO2005049941 | A1 | | 6/2005 | |
| WO | 2006044693 | A2 | | 4/2006 | |
| WO | 2011099349 | A1 | | 8/2011 | |
| WO | WO2012013274 | A1 | | 2/2012 | |
| WO | WO2012101560 | A1 | | 8/2012 | |
| WO | 2013008506 | A1 | | 1/2013 | |
| WO | 2018007111 | A1 | | 1/2018 | |
| WO | 2020254081 | A1 | | 12/2020 | |
| WO | 2022242728 | A1 | | 11/2022 | |
| WO | 2023061780 | A1 | | 4/2023 | |

OTHER PUBLICATIONS

Makita, "ConnectX™, LXT®, LXT® X2 and XGT® Portable Backpack Power Supply," <https://www.makitatools.com/products/details/PDC01> web page visited Jul. 28, 2023 (3 pages).
Multiquip, "FXA50A4," <https://www.multiquip.com/multiquip/FXA50A4.htm> web page visited Jul. 28, 2023 (1 page).
Extended European Search Report for Application No. 23187914.9 dated May 23, 2024 (8 pages).

* cited by examiner

CONCRETE VIBRATOR SYSTEM

CROSS REFERENCE TO RELATED APPLICATIONS

This application claims priority to U.S. Provisional Patent Application No. 63/386,733, filed Dec. 9, 2022, and U.S. Provisional Patent Application No. 63/392,615, filed Jul. 27, 2022, the entire contents of each of which are incorporated herein by reference.

FIELD OF THE INVENTION

The present invention relates to power tools, and more particularly to concrete vibrators.

BACKGROUND OF THE INVENTION

Concrete vibrators are typically used to spread poured concrete around a framework, such as rebar, in a construc- tion operation. Such concrete vibrators are typically pow- ered by an internal combustion engine, which can be difficult to carry by an operator using the concrete vibrator while on a worksite.

SUMMARY OF THE INVENTION

The present invention provides, in one aspect, a concrete vibrator system comprising a vibrating head. The vibrating head includes a shaft having a center of mass radially offset from a rotational axis of the shaft. The vibrating head further includes an onboard electric motor configured to provide torque to the shaft, thereby causing the shaft to rotate. The vibrating head is connected via a cable to a portable power unit including a battery pack configured to provide electrical current to the motor. The cable is configured to transmit electrical current from the battery pack to the motor and a motor control signal from the portable power unit to the motor.

The present invention provides, in another aspect, a concrete vibrator system comprising a power source and a cable having a first end and a second end. The first end is electrically connected to the power source, and the cable is configured to transmit electrical current from the power source. The concrete vibrator system further comprises a first vibrating head and a second vibrating head different from the first vibrating head. The first and second vibrating heads are interchangeably removably couplable to the sec- ond end of the cable.

The present invention provides, in another aspect, a modular concrete vibrator system comprising a battery receptacle unit configured to selectively interchangeably receive a first battery pack and a second battery pack. Each battery pack is configured to provide electrical current to a motor. The modular concrete vibrator system further com- prises a motor control unit configured to generate a control signal for transmission. The motor control unit is integrated in a common housing with the battery receptacle unit. The common housing includes an electrical connection config- ured to selectively interchangeably receive a first cable and a second cable, each cable configured to transmit electrical current and to transmit the control signal. The modular concrete vibrator system further comprises a first vibrating head and a second vibrating head. Each vibrating head is configured to selectively interchangeably couple to the first cable and to selectively interchangeably couple to the sec- ond cable.

The present invention provides, in another aspect, a power tool assembly comprising a power tool including a housing and an electric motor within the housing. The motor includes a rotatable shaft and a radial bearing supporting the rotatable shaft. The power tool further includes a bearing retainer having a first pocket in which the radial bearing is received to support the radial bearing relative to the housing. The power tool assembly further comprises a cable that is configured to supply electrical current to the electric motor. An end of the cable includes a first electrical connector. The power tool assembly further comprises a second electrical connector that is received within a second pocket in the bearing retainer. The second electrical connector is selec- tively connectable to the first electrical connector to elec- trically connect the electric motor to the cable.

Other features and aspects of the invention will become apparent by consideration of the following detailed descrip- tion and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
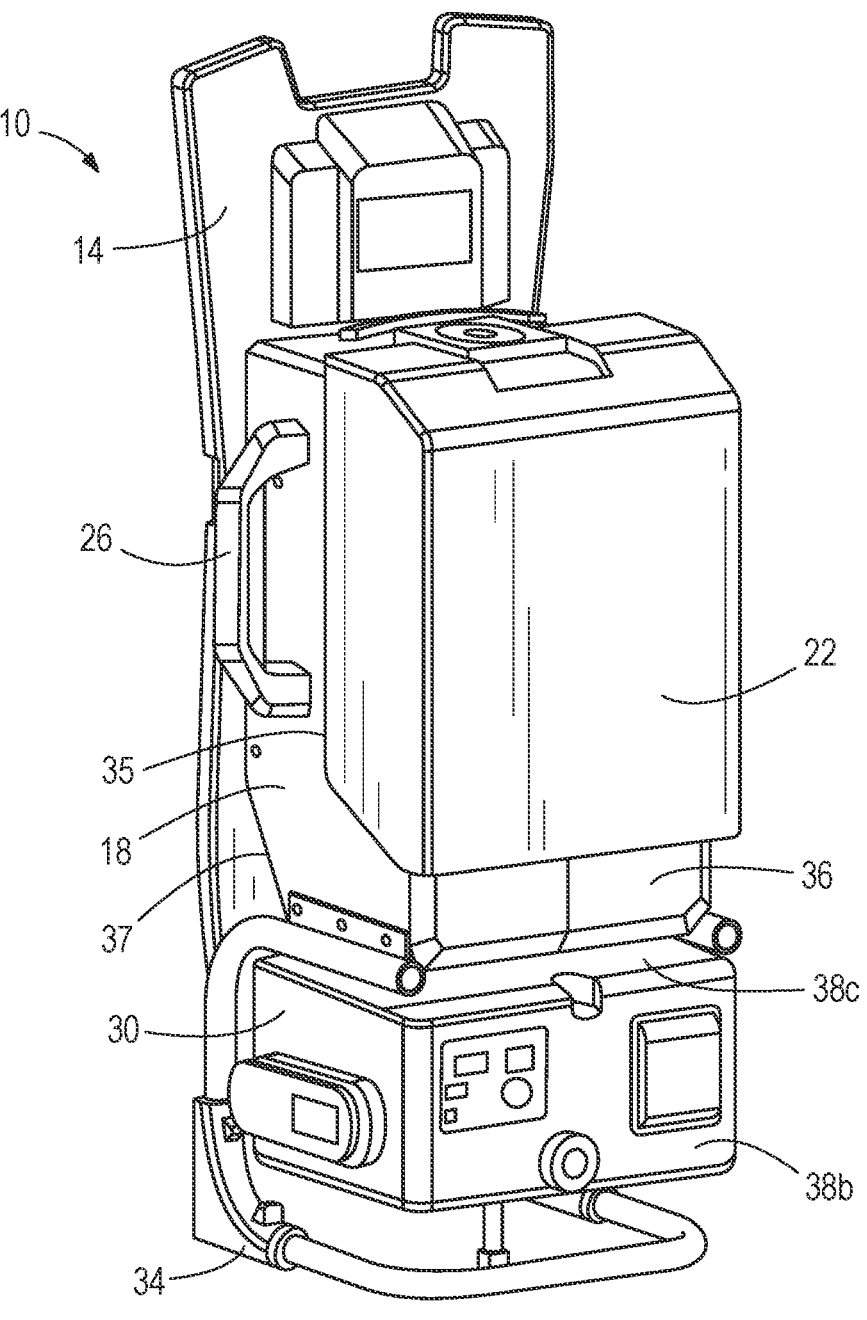
FIG. 1 is a perspective view of a portable power unit for use with a portable concrete vibrator.

With reference to FIG. 1, a portable power unit 10 includes a frame or backpack 14, a battery receptacle unit 18, a battery pack 22 attached to the battery receptacle unit 18, a pair of handles 26 to facilitate hand-carrying the unit 18 (the second handle 26 being shown in FIG. 2), a motor control unit 30, and a motor control unit guard 34. The backpack 14 generally defines a backpack plane and includes straps or other rigging (not shown) to allow a user to carry the portable power unit 10 on the user's back while the portable power unit 10 is in use or between uses of the portable power unit 10. The straps may include one, two, or more shoulder straps and one or more waist straps. The battery receptacle unit 18 includes a battery receptacle 35 on a front side 36 of the unit 18 to which the battery pack 22 is attachable, with the backpack 14 being attached to a rear side 37 of the unit 18.

With continued reference to FIG. 1, the battery receptacle 35 includes a channel, an electrical terminal, and a latching mechanism. The channel cooperates with a corresponding shaped rail on the battery pack 22 to attach the battery pack 22 to the battery receptacle 35. When the battery pack 22 is attached to the battery receptacle 35, the electrical terminal on the battery receptacle 35 and a corresponding electrical terminal on the battery pack 22 are electrically connected to each other. The latching mechanism protrudes from a surface of the battery receptacle 35 and is configured to engage the battery pack 22 to maintain engagement between the battery pack 22 and the battery receptacle 35. Thus, the battery pack 22 is connectable to and supportable by the battery receptacle 35 such that the battery pack 22 is supportable by the unit 18 and the backpack 14 when worn by a user.

With continued reference to FIG. 1, the battery pack 22 includes a battery pack housing containing a plurality of battery cells. In some embodiments, the battery cells, and therefore the battery pack 22, may have a nominal voltage of up to about 80 V. In some embodiments, the battery cells have a nominal voltage of up to about 120 V. In some embodiments, each of the battery cells has a diameter of up to about 21 mm and a length of up to about 71 mm. In some embodiments, the battery pack 22 includes up to twenty battery cells. In some embodiments, the battery cells are connected in series. In some embodiments, the battery cells are operable to output a sustained operating discharge current of between about 40 A and about 60 A. In some embodiments, each of the battery cells has a capacity of between about 3.0 Ah and about 5.0 Ah.

Figure 2:
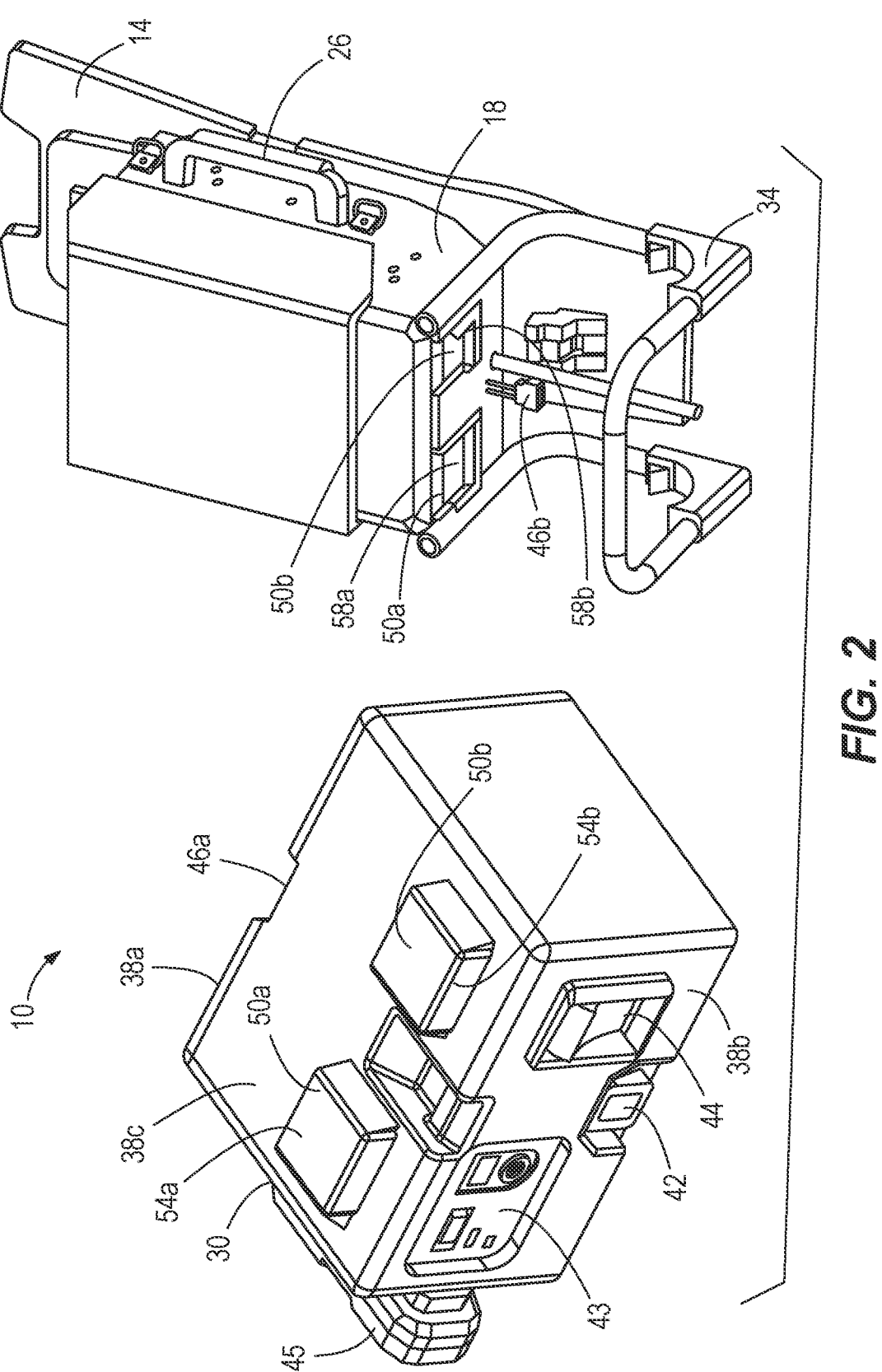
FIG. 2 is an exploded view of the portable power unit of FIG. 1.

With reference to FIGS. 1 and 2, the motor control unit 30 is selectively attachable to the battery receptacle unit 18. The motor control unit 30 includes a first (rear) side 38a that is configured to face the backpack 14 when the motor control unit 30 is attached to the battery receptacle unit 18 and a second (front) side 38b opposite the first side 38a. The motor control unit 30 further includes a third (top) side 38c extending generally perpendicular to the backpack plane and between the rear side 38a and the front side 38b. The top side 38c is facing the battery receptacle unit 18 when the motor control unit 30 is attached thereto. In the illustrated embodiment, the motor control unit 30 is surrounded and protected by the motor control unit guard 34 such that the front side 38b is recessed into the guard 34. In other embodiments, the motor control unit 30 may not be recessed into the guard 34. Further, in the illustrated embodiment, the motor control unit guard 34 is tubular and defines a U-shape when viewed from a direction that is transverse to the backpack 14. In other embodiments, the motor control unit guard 34 may have a variety of different shapes.

With continued reference to FIG. 2, the motor control unit 30 includes a first electrical connection 42 configured to selectively attach the motor control unit 30 to a first end of a cable. The motor control unit 30 also includes a control panel 43 and an on/off switch 44. The control panel 43 may include an arming button and a remote pairing button. The motor control unit 30 may also include a docking port to selectively receive a remote 45. In other embodiments, the remote 45 may be selectively docked at other locations on the portable power unit 10. Further, the motor control unit 30 and the battery receptacle unit 18 include a second electrical connection 46a, 46b configured to selectively electrically connect the motor control unit 30 to the battery receptacle unit 18.

Figure 3:
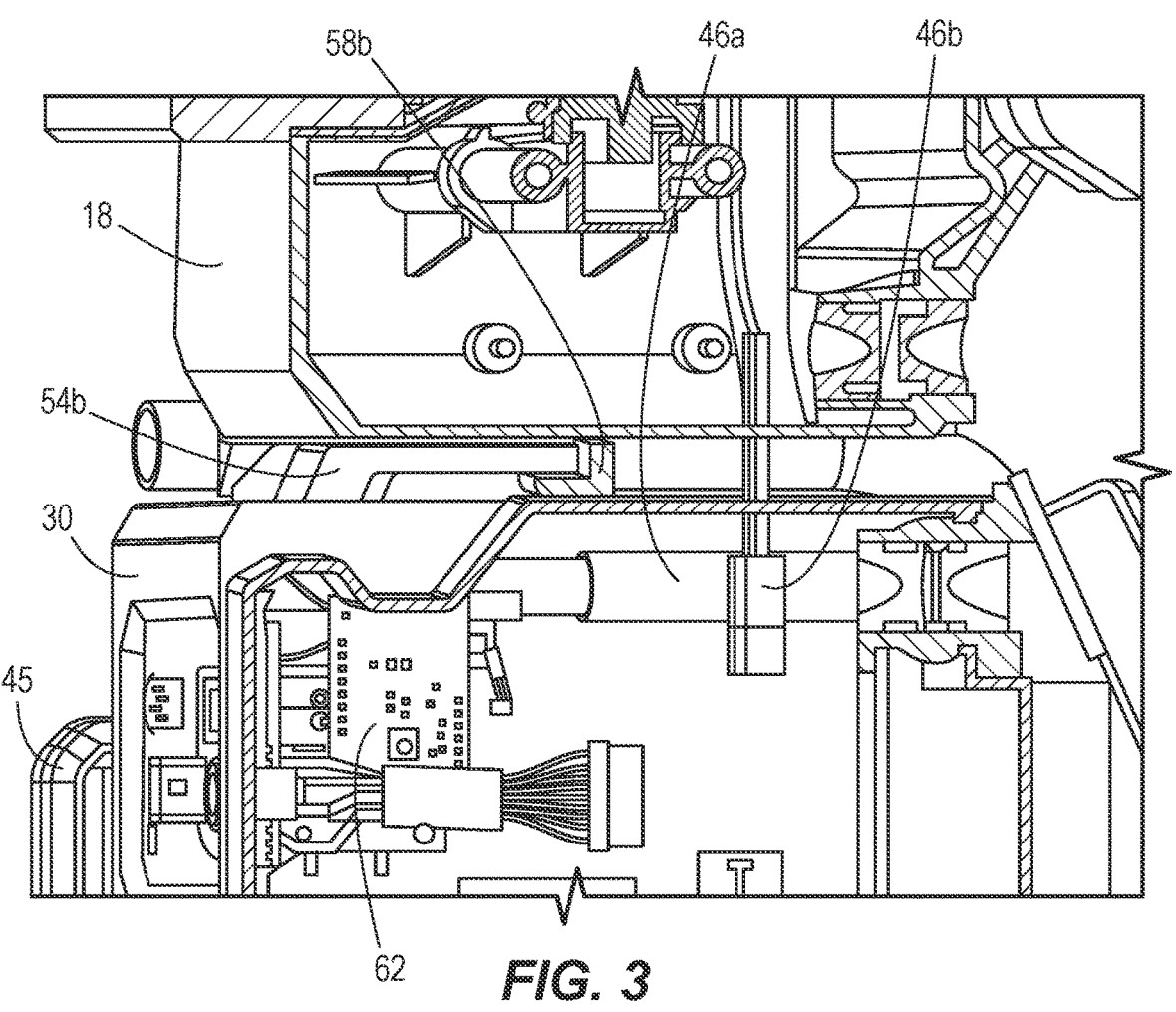
FIG. 3 is a cross-sectional view of a latch coupling a battery receptacle unit and a motor control unit of the portable power unit of FIG. 1.

With continued reference to FIG. 2 and with reference to FIG. 3, the embodiment of FIG. 1 includes one or more mechanical latches that selectively attach the motor control unit 30 to the battery receptacle unit 18. In some embodiments, such as the embodiment of FIG. 1, two mechanical latches 50a, 50b are provided for this purpose, each mechanical latch 50a, 50b including a respective projection 54a, 54b and a respective hook 58a, 58b. In this embodiment, the projections 54a, 54b are provided on the top side 38c of the motor control unit 30 and the hooks 58a, 58b are provided on the battery receptacle unit 18. In this embodiment of the portable power unit 10, the electrical connections 46a, 46b are simultaneously made with the latches 50a, 50b mechanically connecting the motor control unit 30 to the battery receptacle unit 18. With reference to FIG. 3, the motor control unit 30 includes an electronic controller 62 in communication with the first electrical connection 42, the control panel 43, the on/off switch 44, and the second electrical connection 46a, 46b. In other embodiments, some of which are described herein, the motor control unit 30 may be coupled to the battery receptacle unit 18 via a variety of different mechanical and electrical means.

In operation, and with reference to FIGS. 1-3, a power tool is electrically connectable to a second end of the cable that connects to the first electrical connection 42 of the motor control unit 30. In one embodiment, a plurality of power tools may be connectable to the first electrical connection 42. In that embodiment, a single motor control unit 30 can power and control whichever of the plurality of power tools is electrically connected to the motor control unit 30 via the cable. In another embodiment, each power tool includes its own motor control unit 30, and the motor control units 30 are interchangeable in the portable power unit 10 to allow the portable power unit 10 to power and control various power tools. In that embodiment, the portable power unit 10 can power and control whichever of the plurality of power tools has its particular motor control unit 30 coupled to the battery receptacle unit 18.

Figure 4:
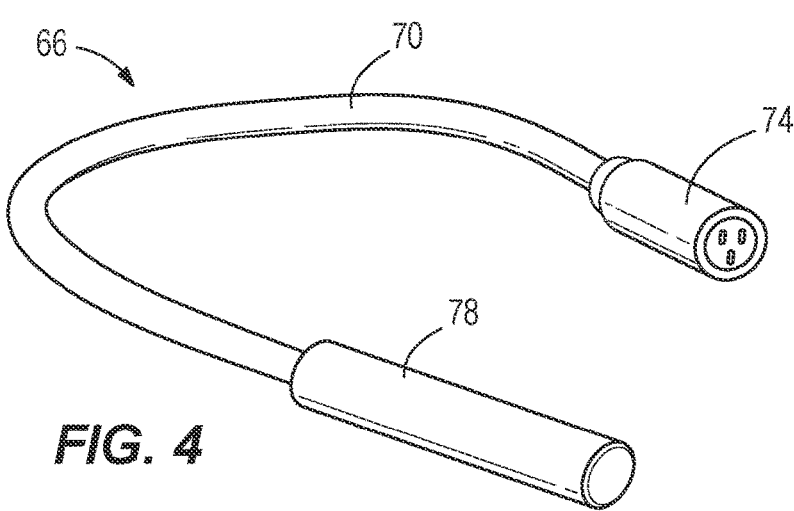
FIG. 4 is a perspective view of a portable concrete vibrator for use with the portable power unit of FIG. 1.
Figure 5:
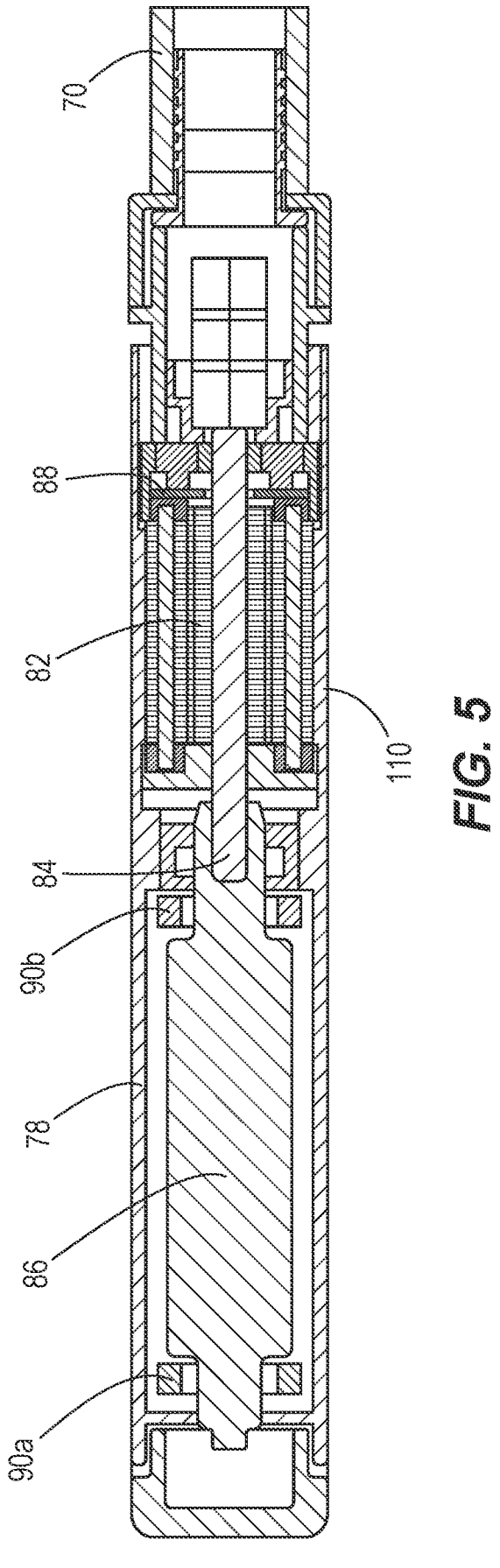
FIG. 5 is a cross-sectional view of a vibrating head of the portable concrete vibrator of FIG. 4.

With continued reference to FIGS. 1-3 and with reference to FIGS. 4 and 5, a portable concrete vibrator, such as a high-cycle concrete vibrator 66, may be powered and controlled by the portable power unit 10, thereby forming a concrete vibrator system. The high-cycle concrete vibrator 66 includes a whip 70, a whip connection 74 that electrically connects the whip 70 to a power cable, and a vibrating head 78. The vibrating head 78 contains an onboard electric motor 82 which, in some embodiments, is a brushless direct current ("BLDC") electric motor 82 that is configured to rotate a drive shaft 84 to which an eccentric mass 86 is affixed (FIG. 5). The electric motor 82 may include a plurality of windings. The eccentric mass 86 is supported at each end by bearings 90*a*, 90*b*. The drive shaft 84 has a center of mass (i.e., an eccentric mass 86) that is radially offset from a rotational axis of the drive shaft 84, and the electric motor 82 is configured to provide torque to the drive shaft 84, thereby causing the drive shaft 84 and the eccentric mass 86 to rotate. Electrical wiring (not shown) transmits electrical current from the motor control unit 30 to the motor 82 via the whip 70 and power cable.

With continued reference to FIG. 5, the electric motor 82 includes a rotor and a stator. The stator may be press-fit to a housing 110 of the vibrating head 78 such that the housing 110 serves as a heat sink for the electric motor 82. The vibrating head 78 also includes a rotational speed-sensing printed circuit board (PCB) 88 operable to detect a rotational speed of the rotor, and therefore a rotational speed of the drive shaft 84 and of the eccentric mass 86. The whip 70 has one or more connectors that plug into the rotational speed-sensing PCB 88 to provide electrical current to the PCB 88 and also to transmit a rotational speed signal to the motor control unit 30.

In operation, and with reference to FIGS. 1-5, a user may wear the portable power unit 10 as a backpack while operating a tool such as the high-cycle concrete vibrator 66. Specifically, a user may hold the whip 70 and use the vibrating head 78 to vibrate concrete while electrical power and control signals are delivered to the high-cycle concrete vibrator 66 from the motor control unit 30, which is connected to the battery receptacle unit 18. The on/off switch 44 may include three positions: "on," "off," and "remote." To shut off power to the motor control unit 30, the user would toggle the on/off switch 44 to the "off" position. To allow the motor control unit 30 to be controlled by the remote 45, the user would toggle the on/off switch 44 to the "remote" position, thereby allowing the remote 45 to control whether the motor control unit 30 is on or off (e.g., whether or not the motor control unit 30 is armed) and whether the tool, such as the vibrator 66, is activated. To arm the motor control unit 30 without using the remote 45, the user would toggle the on/off switch 44 to an "on" state in which electrical current from the battery pack 22 is supplied to the controller 62, thereby waking the controller 62 and readying the controller 62 to accept an input from the control panel 43. Then, using the control panel 43, the user could activate a tool such as the vibrator 66 by pressing a button on the control panel 43 to selectively activate the tool or to allow the tool to be selectively activated by actuating another switch. Activating the tool and/or the motor 82 may allow the motor 82 to rotate at a predefined rotational speed coinciding with a pre-set vibrational frequency. To pair the remote 45 with the motor control unit 30, the user may press the remote pairing button on the control panel 43, thereby allowing wireless communication between the remote 45 and the motor control unit 30. Output of the rotational speed-sensing PCB 88 is transmitted through the whip 70 and cable to the motor control unit 30, which, based on the feedback from the PCB 88, may adjust the rotational speed of the motor 82 as necessary to ensure that the vibration frequency of the vibrator 66 remains consistent as the vibrating head 78 is plunged into wet concrete.

In operation, and with continued reference to FIGS. 1-5, the use of the portable power unit 10 may have a benefit of reducing an amount of weight that must be carried by the arms of the user when operating the high-cycle concrete vibrator 66. The high-cycle concrete vibrator 66 may be interchangeable with other tools such that the same portable power unit 10, or at least the same battery receptacle unit 18, can be used to power and control a plurality of different power tools.

Figure 6:
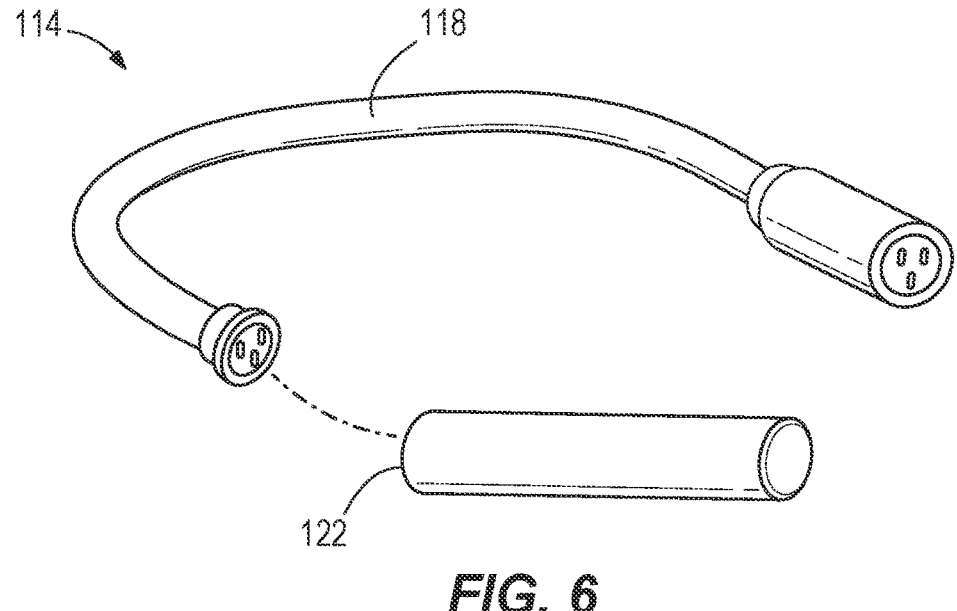
FIG. 6 is another embodiment of a portable concrete vibrator for use with the portable power unit of FIG. 1.
Figure 7:
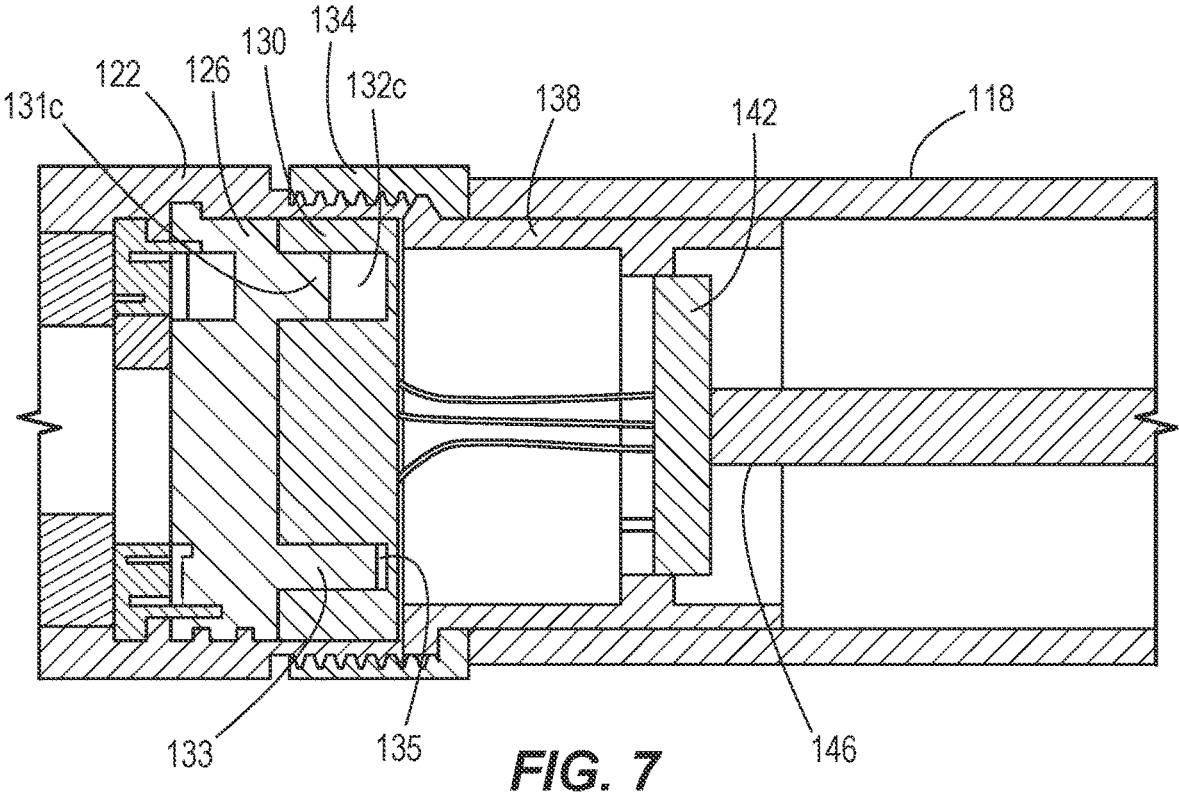
FIG. 7 is a cross-sectional view of a connection between a vibrating head and a whip of the portable concrete vibrator of FIG. 6.
Figure 8:
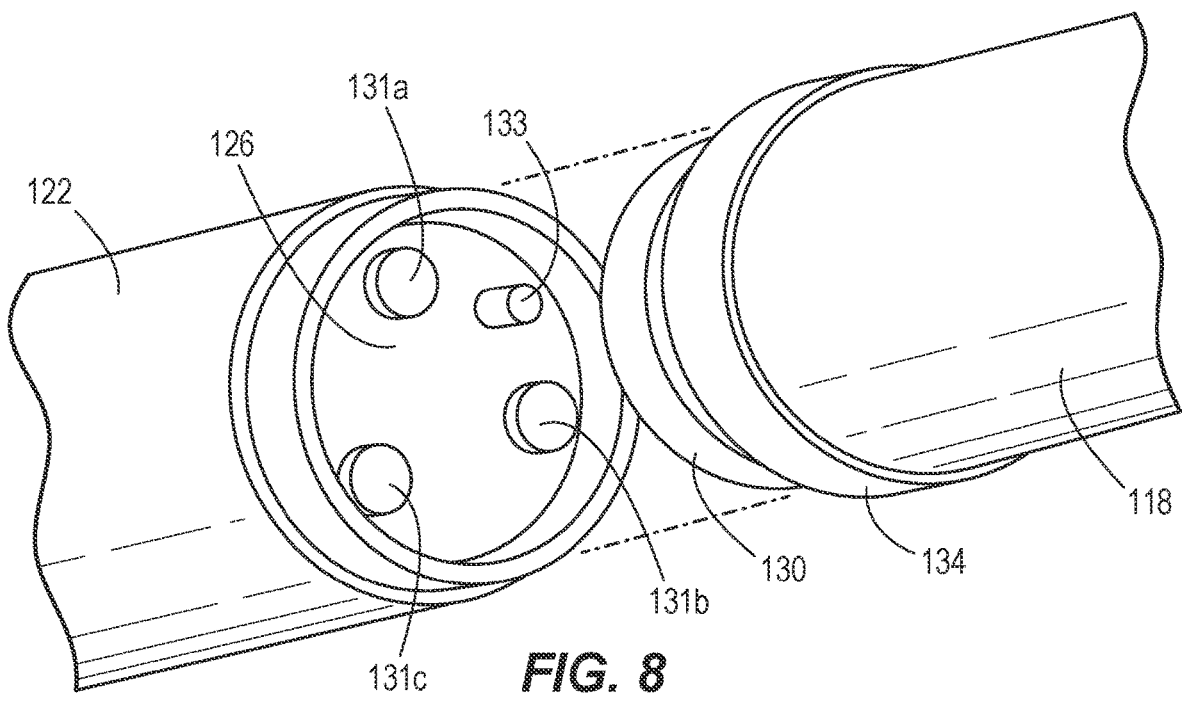
FIG. 8 is a perspective view of the connection between the vibrating head and the whip of the portable concrete vibrator of FIG. 6.

With reference to FIGS. 6-8, another embodiment of a high-cycle concrete vibrator 114 includes a whip 118 that is configured to selectively attach to and detach from a modular vibrating head 122. The modular vibrating head 122 includes a connector capsule 126 within the modular vibrating head 122 that electrically interfaces with a whip connector 130 within the whip 118. The connector capsule 126 includes a plurality of connector terminal pins 131*a*, 131*b*, 131*c*. The connector terminal pins 131*a*, 131*b*, 131*c* are configured to interface with a plurality of connector terminal recesses in the whip connector 130 (a connector terminal recess 132*c* being shown in FIG. 7) to provide electrical communication between the connector capsule 126 and the whip connector 130. Further, a support pin 133 on the connector capsule 126 is inserted into a support pin recess 135 in the whip connector 130 to prevent relative rotation between the connector capsule 126 and the whip connector 130. A head collar 134 partially surrounds the whip connector 130 and provides a mechanical connection and seal between the modular vibrating head 122 and the whip 118. The mechanical connection may comprise a threaded interface between external threads on the modular vibrating head 122 and internal threads on the head collar 134. A whip fitting 138 is positioned at least partially within the whip 118 and provides a fixing point between the head collar 134 and the whip 118. A grommet 142 within the whip 118 surrounds a multi-conductor electrical cable 146 and provides strain relief thereto.

In operation, and with reference to FIGS. 6-8, the modular vibrating head 122 may be selectively removable from the whip 118 such that another modular vibrating head (which may be of the same or different construction) may be attached to the whip 118. Such interchangeability allows a user to change the diameter of the modular vibrating head 122 and the length of the whip 118 independently. To interchange the modular vibrating head 122 for another, the collar 134 is unscrewed and the head 122 is pulled from the whip 118, disconnecting the capsule 126 from the whip connector 130. Then, a new vibrating head is connected to the whip 118 using the reverse procedure.

Figure 9:
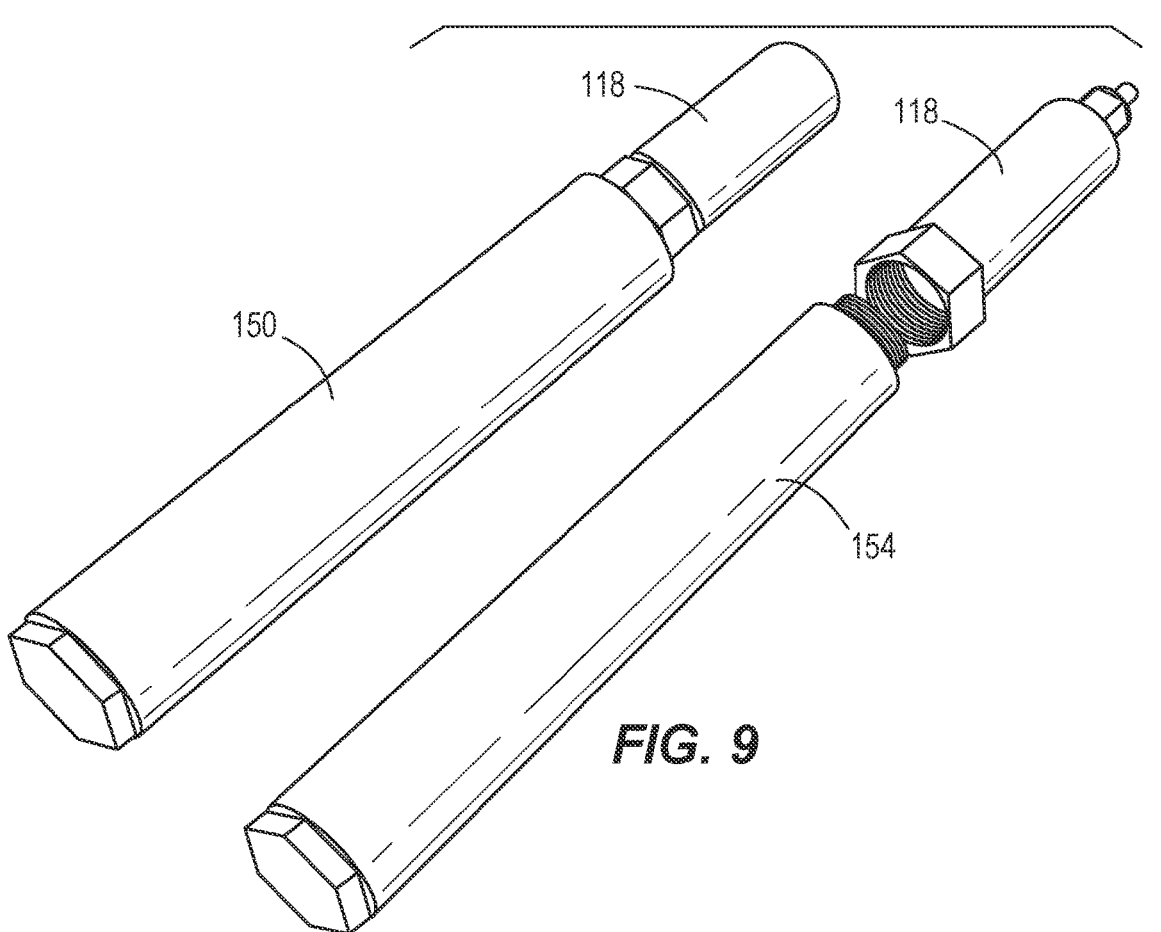
FIG. 9 is a perspective view of two vibrating heads operable with the portable concrete vibrator of FIG. 6.

With reference to FIG. 9 and with continued reference to FIG. 6, a first modular vibrating head 150 and a second modular vibrating head 154 may be interchangeably connectable to the whip 118. The first modular vibrating head 150 may have a diameter of about 58.42 mm (2.3 inches) and the second modular vibrating head 154 may have a diameter of about 45.72 mm (1.8 inches). In other embodiments, different vibrating heads may be used which have a diameter between 45.72 mm and 58.42 mm, greater than 58.42 mm, or less than 45.72 mm. In some embodiments, a vibrating head may have a diameter of about 48.26 mm (1.9 inches). In some embodiments, a vibrating head may have a diameter of approximately 40 mm, approximately 50 mm, or approximately 60 mm.

Figure 10:
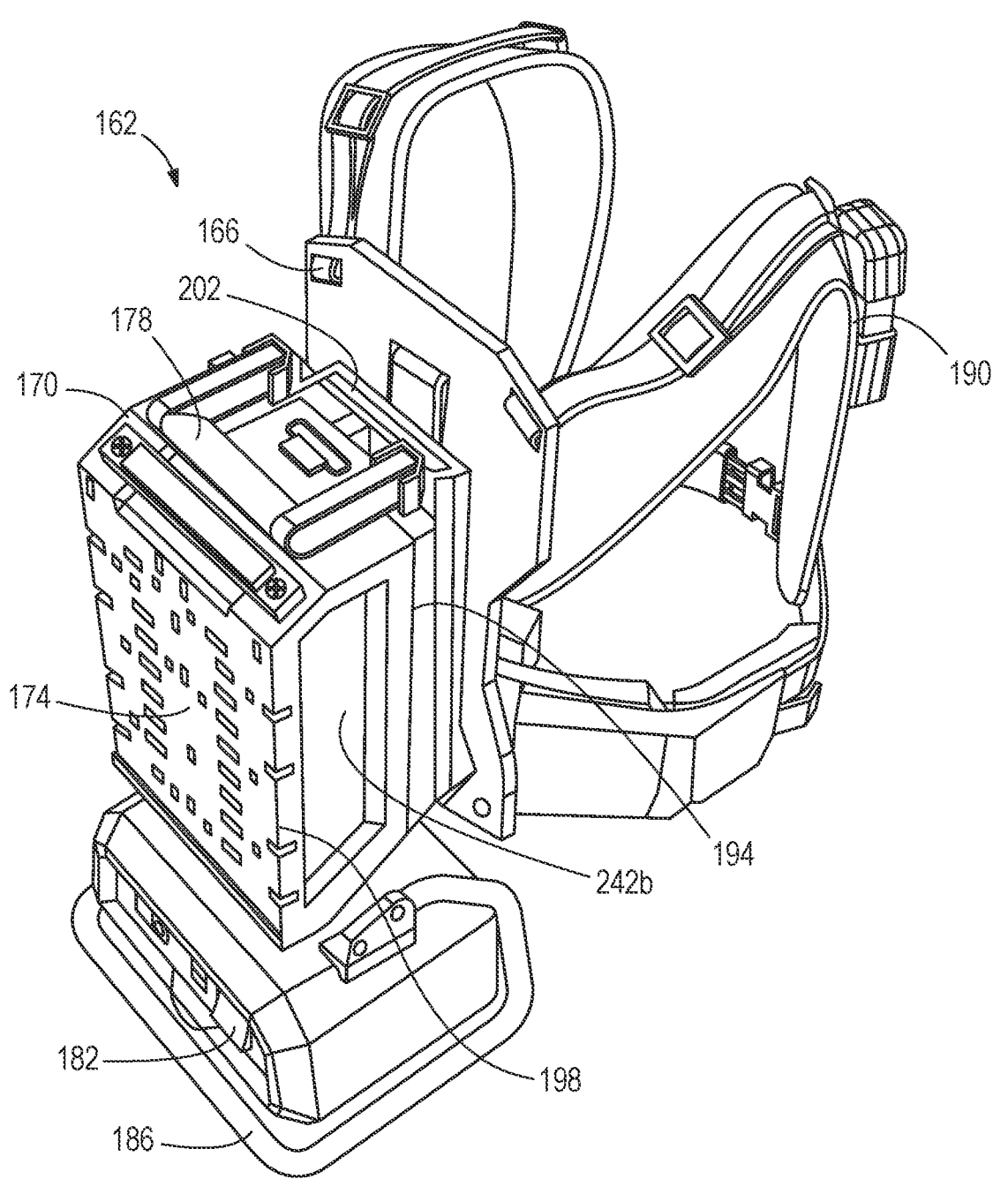
FIG. 10 is a perspective view of another embodiment of a portable power unit for use with a portable concrete vibrator.

With reference to FIG. 10, an embodiment of a portable power unit 162 includes a frame or backpack 166, a battery receptacle unit 170, a battery pack 174 attached to the battery receptacle unit 170, a handle 178 to facilitate hand-carrying the portable power unit 162, a motor control unit 182, and a motor control unit guard 186. The backpack 166 generally defines a backpack plane and includes straps or other rigging 190 to allow a user to carry the portable power unit 162 on the user's back while the portable power unit 162 is in use or between uses of the portable power unit 162. The battery receptacle unit 170, which may also be called a power box, includes a battery receptacle 194 on a front side 198 of the unit 162 to which the battery pack 174 is attachable, with the backpack 166 being attached to a rear side 202 of the unit 162. The battery pack 174 may attach to the battery receptacle unit 170 in a similar manner to how the battery pack 22 attaches to the battery receptacle unit 18 as shown in, for example, FIG. 1.

Figure 11:
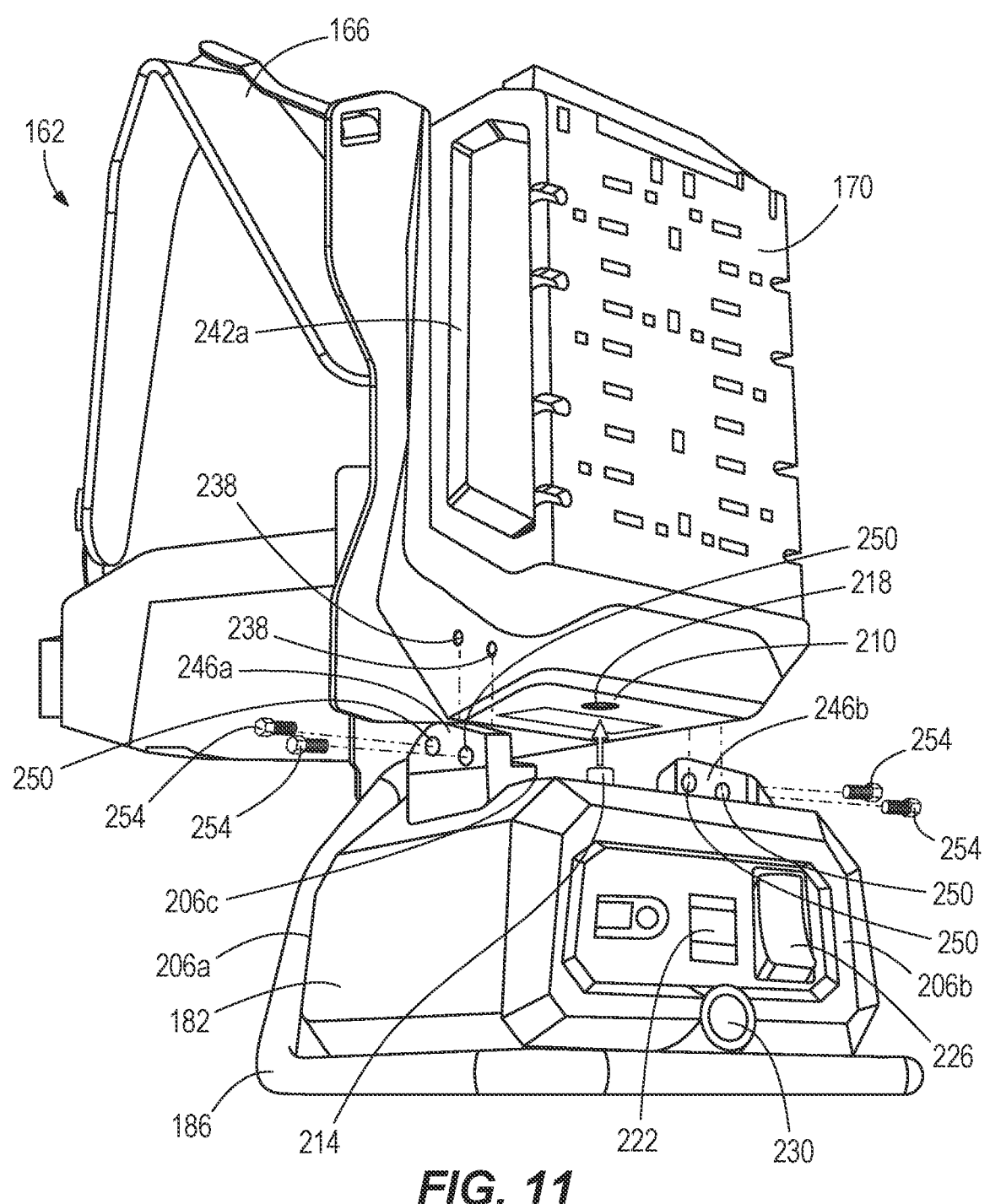
FIG. 11 is a lower perspective view of a coupling between a battery receptacle unit and a motor control unit of the portable power unit of FIG. 10.
Figure 12:
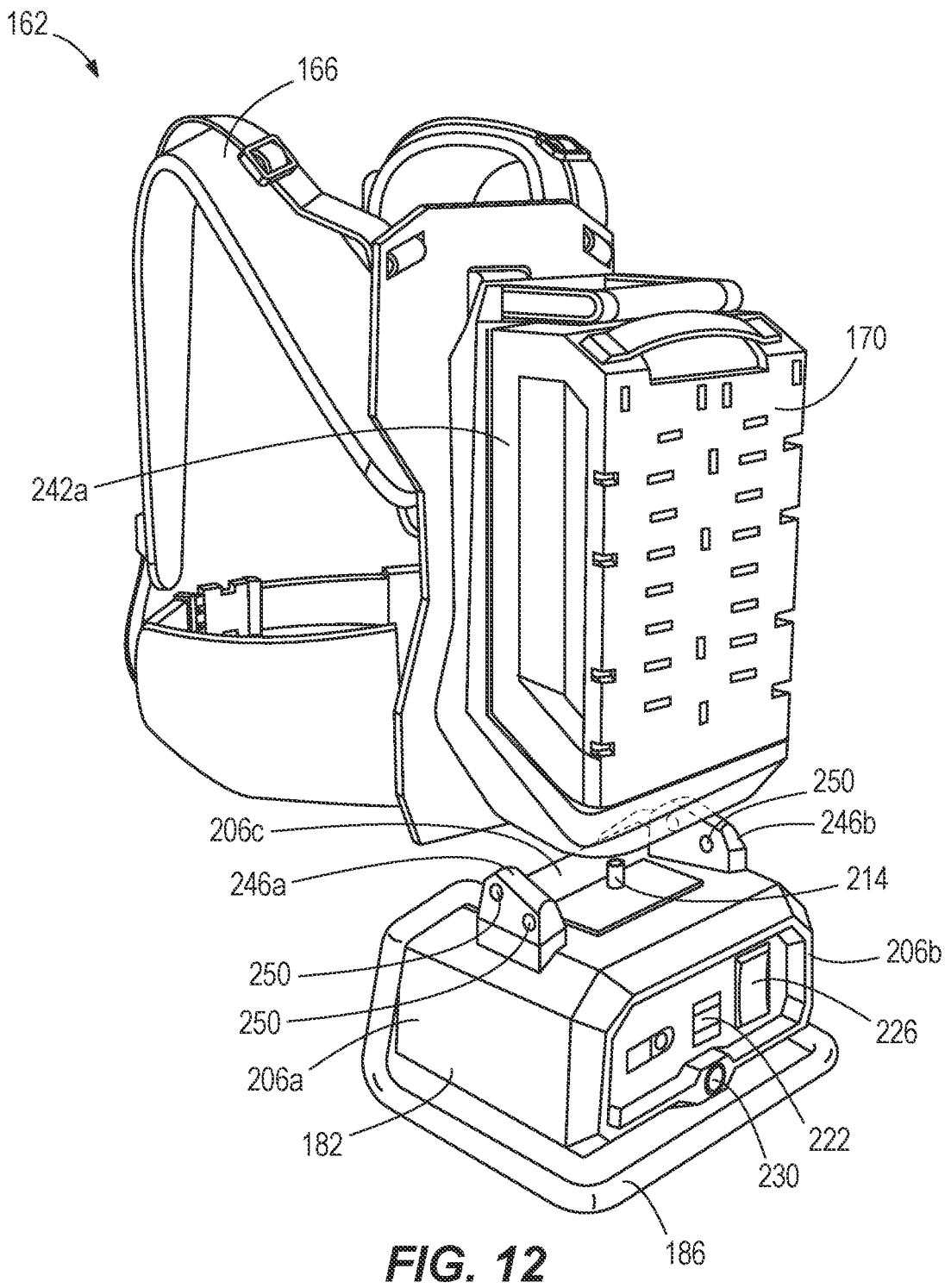
FIG. 12 is an upper perspective view of the coupling between the battery receptacle unit and the motor control unit of the portable power unit of FIG. 10.

With reference to FIGS. 10-12, the motor control unit 182 is selectively attachable to the battery receptacle unit 170. The motor control unit 182 includes a first (rear) side 206a that is configured to face the backpack 166 when the motor control unit 182 is attached to the battery receptacle unit 170 and a second (front) side 206b opposite the first side 206a. The motor control unit 182 further includes a third (top) side 206c extending generally perpendicular to the backpack plane and between the rear side 206a and the front side 206b. The top side 206c is facing the battery receptacle unit 170 when the motor control unit 182 is attached thereto. The motor control unit 182 is surrounded and protected by the motor control unit guard 186 such that the front side 206b is recessed into the guard 186. In the illustrated embodiment, the motor control unit guard 186 is tubular.

With continued reference to FIGS. 11 and 12, the motor control unit 182 includes a sub-flush electronics connection 210. The sub-flush electronics connection 210 is an interface between a male protrusion 214 in the form of a rigid connector on the motor control unit 182 and a female recess 218 within the battery receptacle unit 170. The sub-flush electronics connection 210 is configured to selectively electrically connect the motor control unit 182 to the battery receptacle unit 170 by plugging the male protrusion 214 into the female recess 218 on the battery receptacle unit 170. The sub-flush electronics connection 210 protects the electrical connection between the motor control unit 182 and the battery receptacle unit 170. The motor control unit 182 also includes a control panel 222, an on/off switch 226, and a first electrical connection 230 configured to selectively attach a first end of a cable 234 (shown in FIG. 13) to the motor control unit 182.

With continued reference to FIGS. 11 and 12, the battery receptacle unit 170 includes a plurality of first bores, each first bore housing a threaded insert 238. In the illustrated embodiment, two threaded inserts 238 are each housed within a respective first bore on a first side 242a of the battery receptacle unit 170, and two threaded inserts 238 are each housed within a respective first bore on a second side 242b of the battery receptacle unit 170. The motor control unit 182 includes two protruding ears 246a, 246b. Each of the two protruding ears 246a, 246b extends upward from the motor control unit 182 in a direction toward the battery receptacle unit 170. Each of the two protruding ears 246a, 246b includes a plurality of second bores 250, each second bore 250 configured to receive a bolt 254. Each one of the second bores 250 is configured to align with a respective one of the threaded inserts 238 when the motor control unit 182 is electrically connected to the battery receptacle unit 170. In other words, when the male protrusion 214 is fully received within the female recess 218, each second bore 250 is aligned with a threaded insert 238 such that a bolt 254 may be passed into each of the second bores 250 and threaded into a threaded insert 238. When installed, the bolts 254 are configured to attach and hold the motor control unit 182 to the battery receptacle unit 170.

Figures 13, 14:
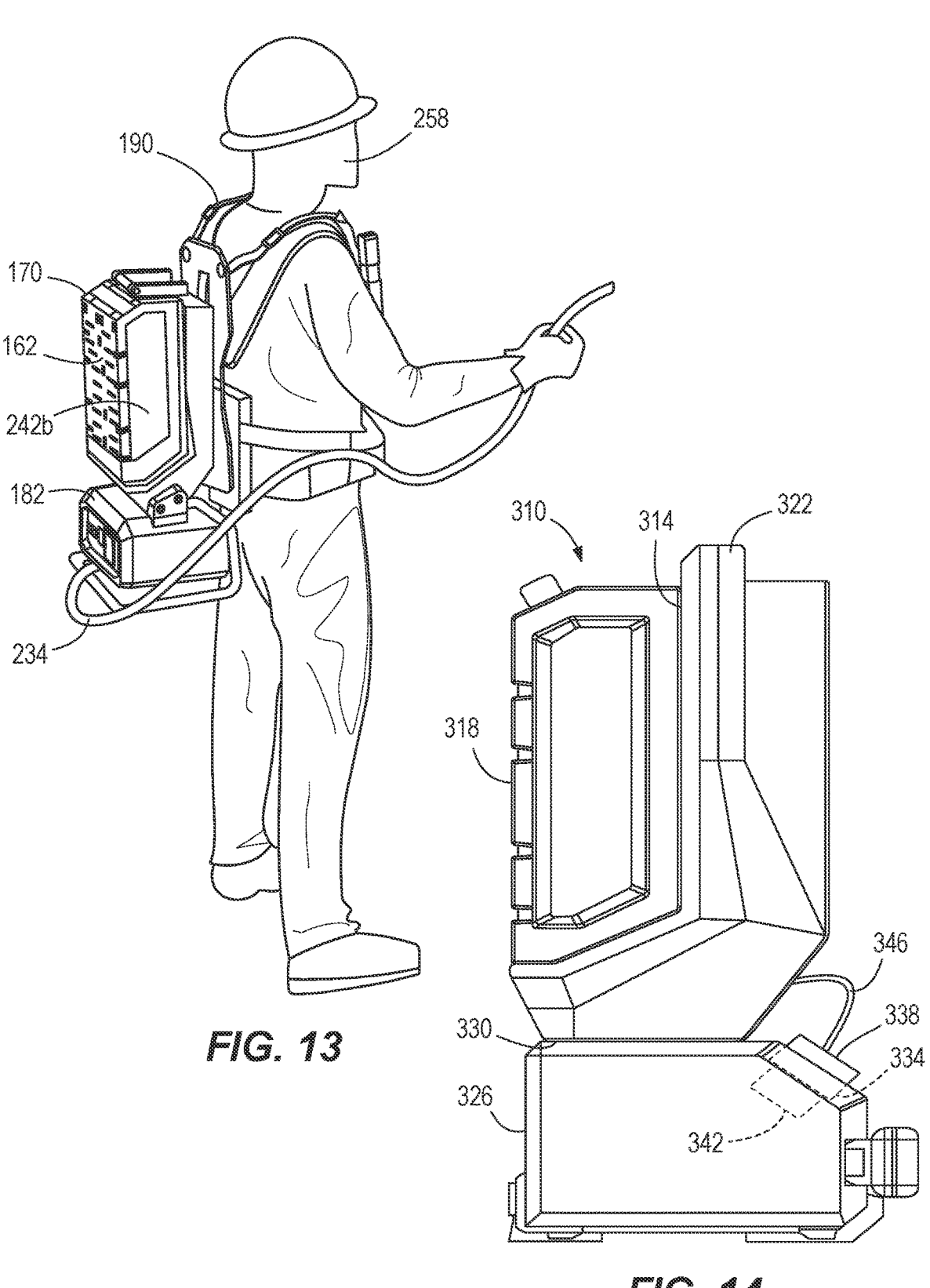
FIG. 13 is a perspective view of the portable power unit of FIG. 10 in operation with a portable concrete vibrator.
FIG. 14 is a side view of another embodiment of a portable power unit for use with a portable concrete vibrator.

In operation, and with reference to FIG. 13, an operator 258 may attach the rigging 190 to a body of the operator 258 such that the portable power unit 162 is ergonomically supported by the operator 258 while the portable power unit 162 is used to power and control, for example, a high-cycle concrete vibrator 66 (FIG. 4), a high-cycle concrete vibrator 114 (shown in FIG. 6), or another tool.

With reference to FIG. 14, an embodiment of a portable power unit 310 includes a battery receptacle unit 314, a battery pack 318 attached to the battery receptacle unit 314, a handle 322 to facilitate hand-carrying the portable power unit 310, and a motor control unit 326. The portable power unit 310 may be similar to the portable power units 10, 162 except as shown or noted and may be configured as a backpack as described herein. The motor control unit 326 is selectively connectable to the battery receptacle unit 314 via a two-step connection process that includes a mechanical interface 330 and an electrical interface 334. The mechanical interface 330 physically attaches the motor control unit 326 to the battery receptacle unit 314. The mechanical interface 330 may include latches, bolts, screws, or the like. The electrical interface 334 provides electrical communication between a female connector 338 and a male socket 342. The female connector 338 is connected to a cable 346 that electrically connects the female connector 338 to the battery receptacle unit 314. In operation, electrical current flows through the cable 346, through the female connector 338, across the electrical interface 334, through the male socket 342, and into the electrical systems of the motor control unit 326, thereby powering the motor control unit 326 and any tools controlled by the motor control unit 326.

Figure 15:
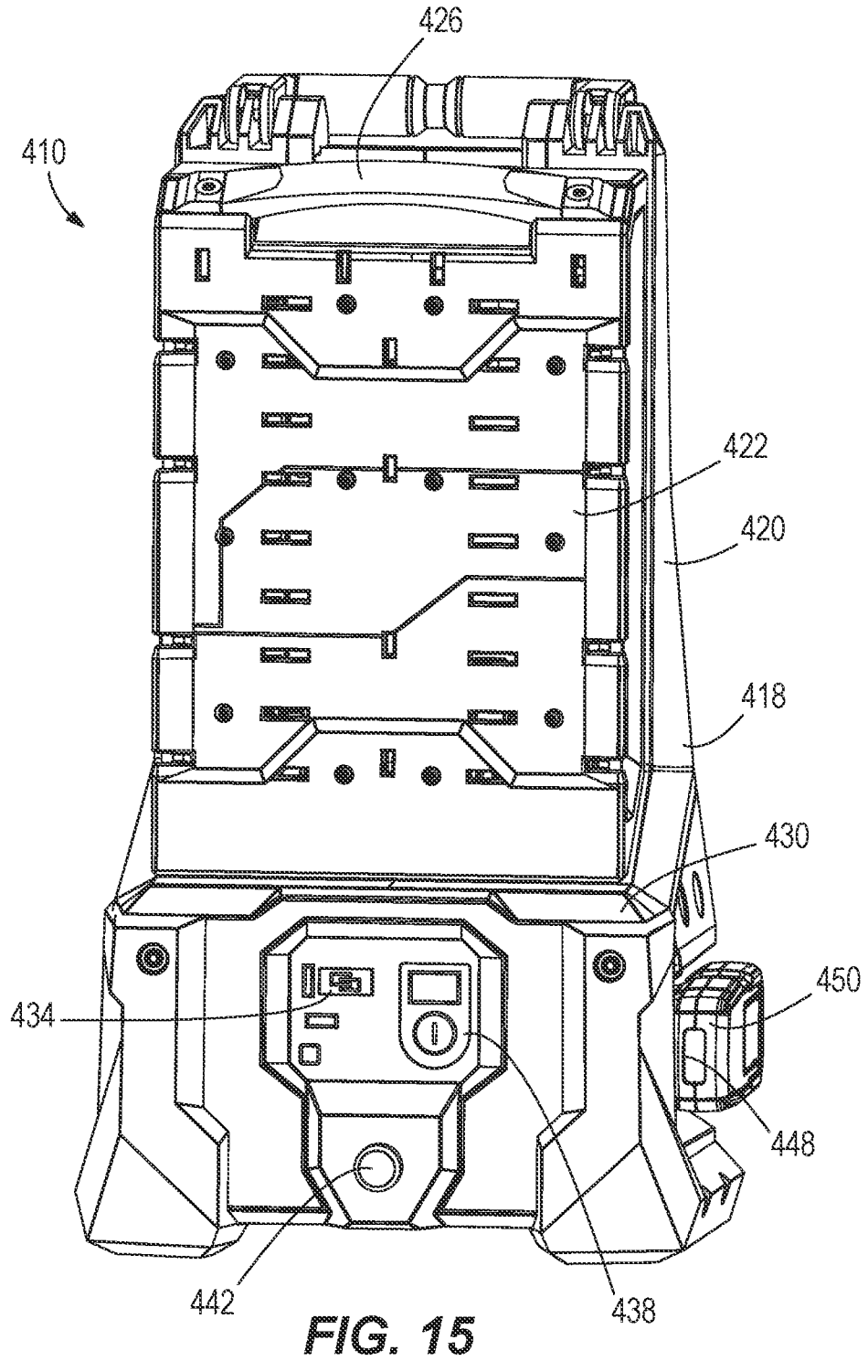
FIG. 15 is a front view of another embodiment of a portable power unit for use with a portable concrete vibrator.
Figures 16, 17:
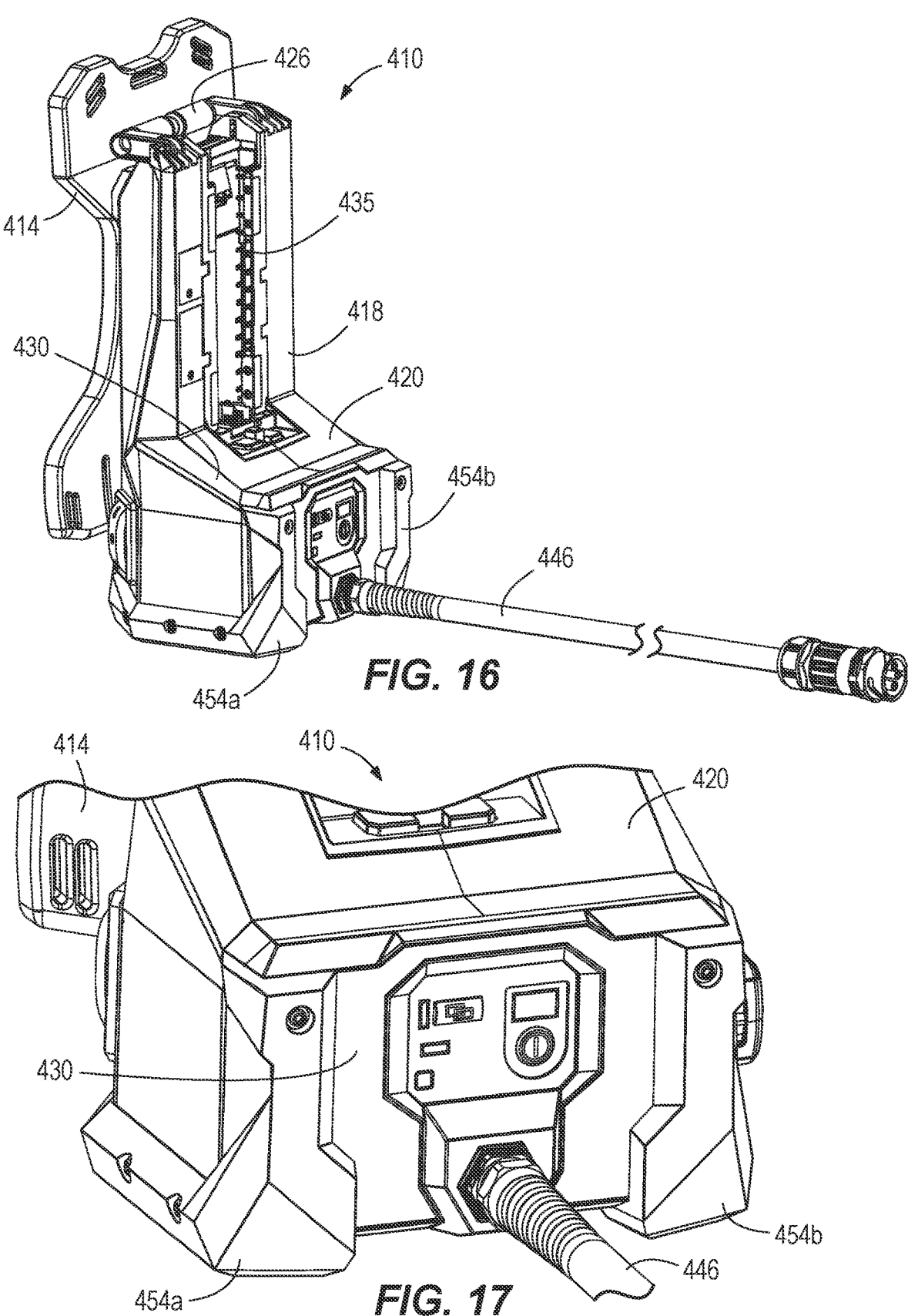
FIG. 16 is a perspective view of the portable power unit of FIG. 15.
FIG. 17 is a perspective view of a portion of the portable power unit of FIG. 15.
Figure 18:
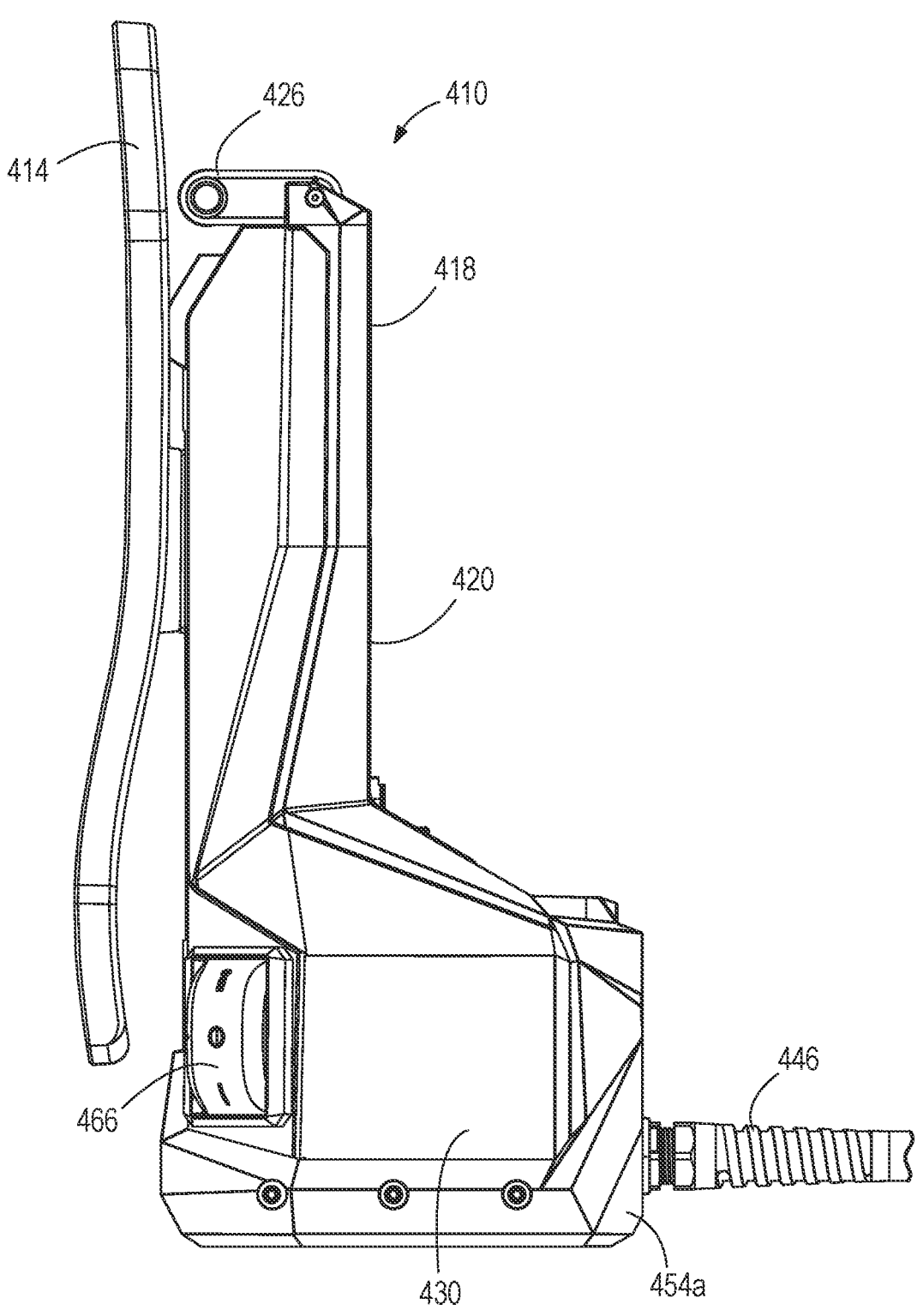
FIG. 18 is a side view of the portable power unit of FIG. 15.

With reference to FIG. 15, a portable power unit 410 includes a frame or backpack 414 (FIG. 16), a battery receptacle unit 418, a battery pack 422 attached to the battery receptacle unit 418, a handle 426 to facilitate hand-carrying the unit 418, and a motor control unit 430. The portable power unit 410 may be similar to the other portable power units described herein, except for certain aspects. For example, the motor control unit 430 is integrated into the battery receptacle unit 418. In other words, the motor control unit 430 and the battery receptacle unit 418 share a common contiguous housing 420. In other words, the common contiguous housing 420 may house both power electronics as well as control electronics, which are used for powering and controlling, for example, the vibrating head 78. Other than being integrated into the battery receptacle unit 418, the motor control unit 430 may be similar to the other motor control units described herein. For example, the motor control unit 430 includes a control panel 434, an on/off switch 438, and a first electrical connection 442 configured to selectively attach a first end of a cable 446 (shown in FIGS. 16-18) to the motor control unit 430. The common contiguous housing 420 includes bump guards 454a, 454b on bottom and front edges of the motor control unit 430 to protect the motor control unit 430 from contact with other objects (FIGS. 16-18). In operation, the power unit 410 may be used to power a high-cycle concrete vibrator.

The motor control unit 430 includes a docking port 448 on a side of the motor control unit 430 to dock a remote control 450. The docking port 448 may be located, for example, generally below the battery receptacle unit 418 and, accordingly, generally below the battery pack 422 when the battery pack 422 is mounted to the battery receptacle unit 418. In other embodiments, the docking port 448 may be mounted to the battery receptacle unit 418 or in another location. The remote control 450 may be mounted to the docking port 448 in a variety of different manners. For example, the remote control 450 may be mounted to the docking port 448 by a clip, such as a spring clip. The spring clip may be attached to the remote control 450 such that when the user slides the remote control 450 into the docking position, the spring clip engages the docking port 448, and in some embodiments, engages with a recess in the docking port 448 to frictionally retain the remote control 450 in the docking position until the user overcomes the frictional force applied by the spring clip to remove the remote control 450 from the docking port 448. The remote control 450 may be used to communicate with the motor control unit 430 and prompt the motor control unit 430 to transmit a motor control signal to a motor such as, for example, one of the motors 82, 514. In addition to the remote control, the portable power unit 410 may include a user interface (e.g., the control panel 434) on a housing such as the common contiguous housing 420, and the user may operate the user interface to prompt the motor control unit 430 to transmit the motor control signal to the motor. In some embodiments, one or both of the remote control 450 or the user interface may be operable to prompt the motor control unit 430 to vary a rotational speed of the motor.

Figure 19:
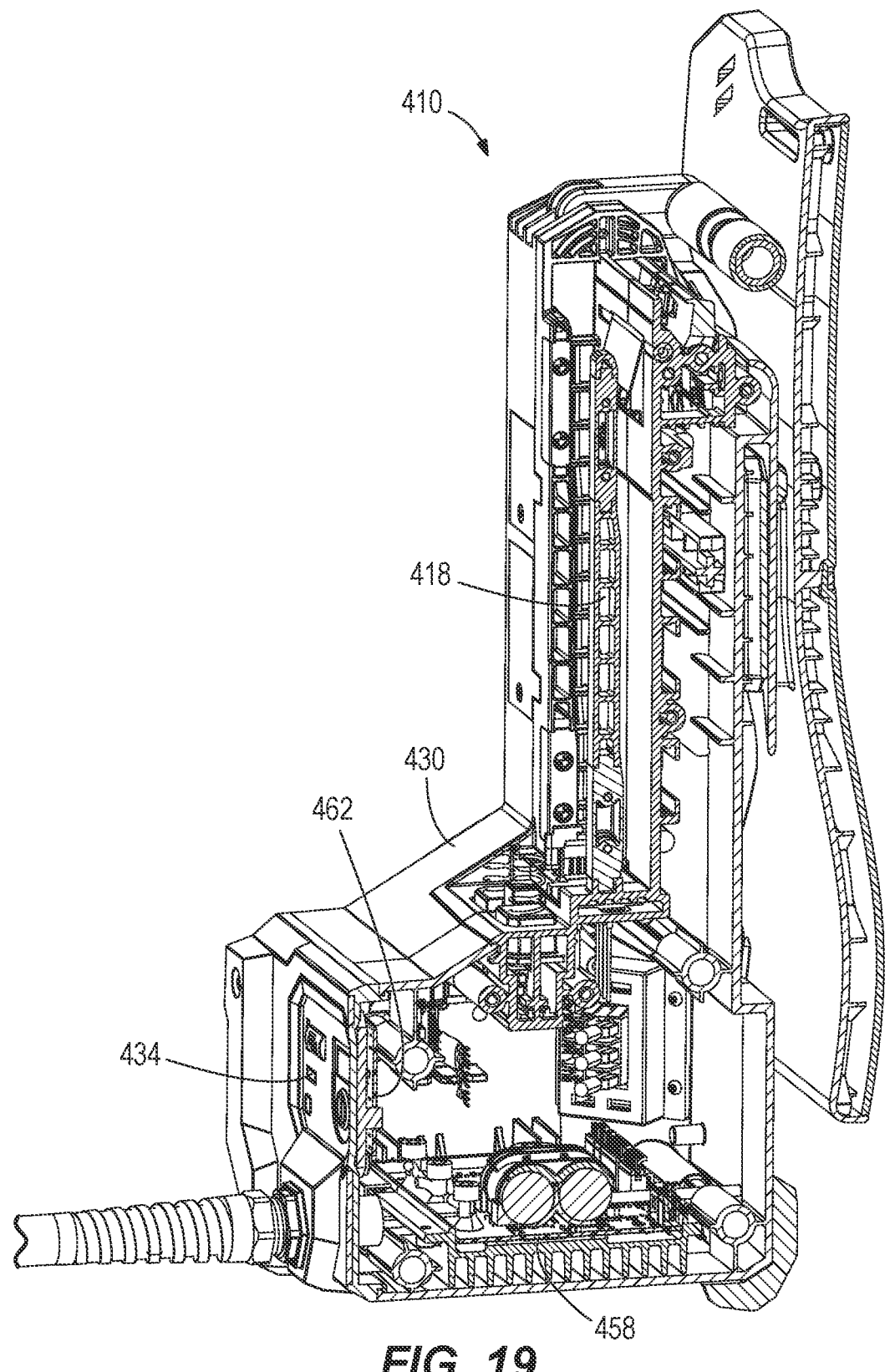
FIG. 19 is cross-sectional view of the portable power unit of FIG. 15.

With reference to FIG. 19, the portable power unit 410, and specifically the motor control unit 430, may include a power and/or control PCB 458, which may be referred to simply as a power PCB 458 or as a control PCB 458, for controlling a flow of electrical current from the battery pack 422 to, among other things, a power tool such as the vibrator 66 (FIG. 4). The power PCB 458 may be positioned below the battery receptacle unit 418 and, therefore, below the battery pack 422 when the battery pack 422 is mounted to the battery receptacle unit 418. The portable power unit 410, and specifically the motor control unit 430, may further include a user interface PCB 462 located, for example, below the battery receptacle unit 418 and, therefore, below the battery pack 422 when the battery pack 422 is mounted to the battery receptacle unit 418. The power PCB 458 may include electronic switches (e.g., field effect transistors) to commutate a motor such as one of the motors 82, 514. The power PCB 458 may include microprocessors for receiving sensor inputs and/or user inputs from the control panel 434 and/or from the user interface PCB 462. In some embodiments, the functions of the power PCB 458 and the user interface PCB 462 are combined and performed by, for example, a single PCB. In some embodiments, the functions of the power PCB 458 and the user interface PCB 462 are divided and performed by three or more PCBs.

With returning reference to FIGS. 15 and 18, the portable power unit 410 includes a mode selector switch 466 that may include, for example, three positions: "on," "off," and "remote." To shut off power to the motor control unit 430 and/or to shut off power to a power tool such as a high cycle concrete vibrator that is connected to the motor control unit 430, the user may toggle the mode selector switch 466 to the "off" position. To allow the motor control unit 430 to be controlled by the remote control 450, the user may toggle the mode selector switch 466 to the "remote" position, thereby allowing the remote control 450 to control whether the motor control unit 430 is on or off (e.g., whether the motor control unit 430 is armed) and whether the power tool, such as, for example, the vibrator 66 (FIG. 4), is activated.

With continued reference to FIGS. 15 and 18, to arm the motor control unit 430 without using the remote control 450, the user may toggle the mode selector switch 466 to an "on" state in which electrical current from the battery pack 422 is supplied to the power PCB 458 and/or to the user interface PCB 462, thereby waking the power PCB 458 and/or the user interface PCB 462 and readying the power PCB 458 and/or the user interface PCB 462 to accept an input from the control panel 434. Then, using the control panel 434, the user could activate a tool such as the vibrator 66 (FIG. 4) by pressing a button on the control panel 434 to selectively activate the tool or to allow the tool to be selectively activated by actuating another switch. Activating the tool and/or the motor 82 (FIG. 5) may allow the motor 82 to rotate at a predefined rotational speed coinciding with a pre-set vibrational frequency. In some embodiments, the motor control unit 430 may be configured such that the user may arm a tool such as the vibrator 66 and activate the tool such as the vibrator 66 in a single step (e.g., by pressing a single button on the control panel 434 or by pressing a single button on the remote control 450). In some embodiments, the motor control unit 430 may be configured such that the user may arm the motor control unit 430 and activate a tool such as the vibrator 66 in a single step (e.g., by pressing a single button or actuating a single switch such as the mode selector switch 466). In some embodiments, "arming" refers to waking a controller such as a PCB and readying the controller to accept an input. To pair the remote control 450 with the motor control unit 430, the user may press a remote pairing button 452 (FIG. 30) on the control panel 434, thereby allowing wireless communication between the remote control 450 and the motor control unit 430. Output of the rotational speed-sensing PCB 88 (FIG. 5; see also the Hall-effect board 524 of FIG. 22) is transmitted through the whip 70 (see also the whip 534 of FIG. 22) to the motor control unit 30, which, based on the feedback from the PCB 88, may adjust the rotational speed of the motor 82 as necessary to ensure that the vibration frequency of the vibrator 66 remains consistent as the vibrating head 78 is plunged into wet concrete.

Figure 20:
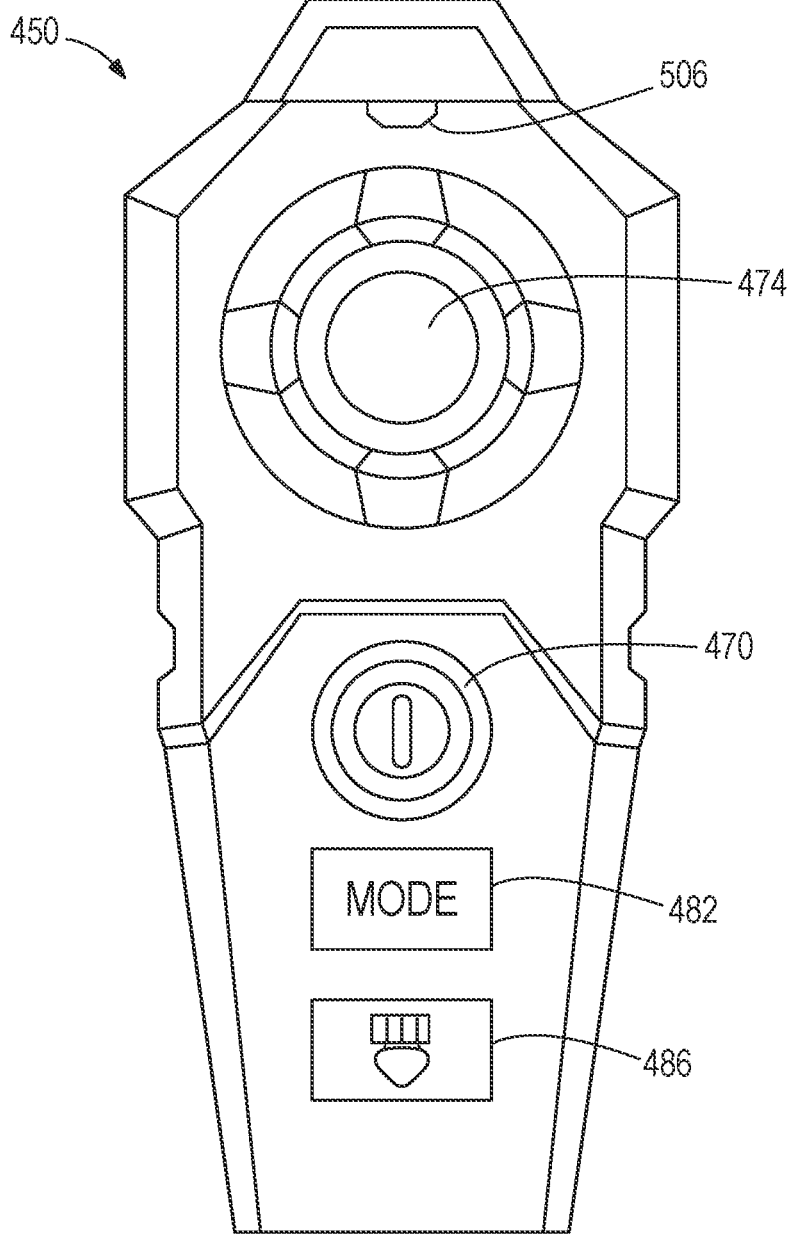
FIG. 20 is a plan view of a remote control unit for use with the portable power unit of FIG. 15.

With reference to FIG. 20, the remote control 450 is capable of wirelessly transmitting a signal to the power PCB 458 and/or to the user interface PCB 462 in response to a user depressing a button on the remote control 450 such as a power button 470. The signal is wirelessly transmitted to the motor control unit 430 to activate and deactivate a motor such as the motor 82 in the vibrating head 78 (FIG. 5). In some embodiments, the motor control unit 430, and more specifically the power PCB 458 and/or the user interface PCB 462, may include feedback control capable of detecting physical properties of wet concrete in which a vibrating head such as the vibrating head 78 is submerged and then adjusting the speed of the motor 82 to optimize a frequency of vibration of the vibrating head 78. Such feedback control may be continuously active as long as the motor 82 remains activated, allowing the frequency of vibration of the vibrating head 78 to be adjusted contemporaneously with movement of the vibrating head 78 throughout the wet concrete.

With continued reference to FIG. 20, additionally or alternatively, the remote control 450 is capable of controlling the speed of the motor 82 with a joystick 474 on the remote control 450. Input from the joystick 474 may be transmitted wirelessly to the motor control unit 430 to adjust the speed of the motor 82. In some embodiments, the joystick 474 may be toggled in a first direction (e.g., toward the right from the frame of reference of FIG. to increase the speed of the motor 82, and toggling the joystick 474 in an opposite, second direction (e.g., toward the left from the frame of reference of FIG. 20) may decrease the speed of the motor 82. Similarly, the joystick 474 may be toggled in a vertical direction (i.e., up or down from the frame of reference of FIG. 20) to adjust the motor 82 between a forward rotational direction and a reverse rotational direction, respectively. Also, in some embodiments, depressing or clicking the joystick 474 (i.e., into the page from the frame of reference of FIG. 20) may adjust the motor 82 between a fast-operating mode and a slow-operating mode, with the speed setting in each mode being preselected from the manufacturer or being user-configurable. Additionally or alternatively, the remote control 450 may utilize a dial potentiometer (not shown) to set or adjust the speed of the motor 82. In the illustrated embodiment, the forward/reverse control and speed control of the motor 82 is integrated using the single joystick 474. However, in alternate embodiments, the forward/reverse control and speed control of the motor 82 may be performed by separate switches or buttons. The remote control 450 is configured to receive user input and transmit the user input to the power PCB 458 and/or the user interface PCB 462. At least one of the power PCB 458 or the user interface PCB 462 may be configured to receive the user input and adjust the operation of the motor based on the user input.

Figure 21:
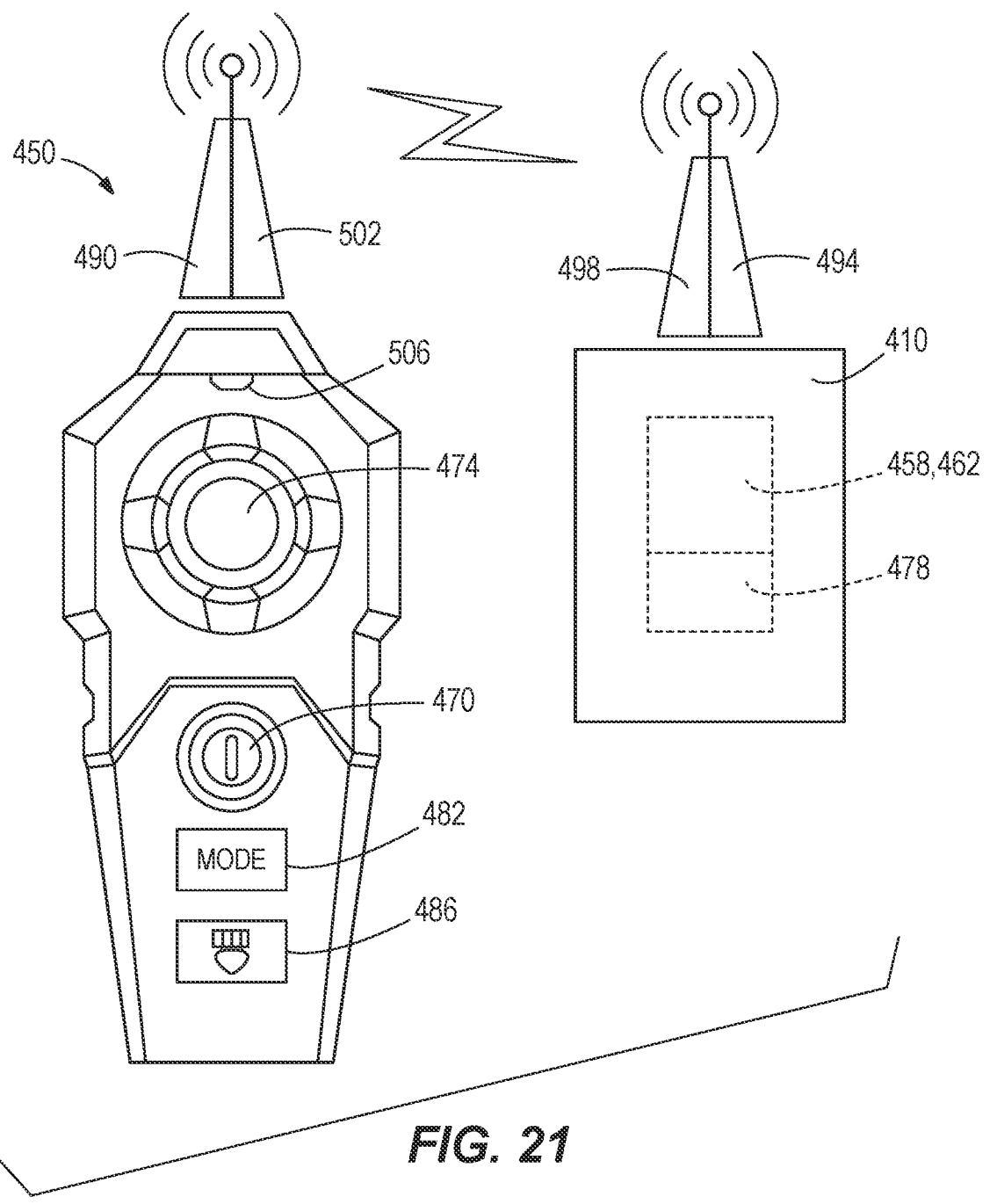
FIG. 21 is a schematic view of the remote control unit of FIG. 20 communicating with the portable power unit of FIG. 15.

With reference to FIG. 21, the portable power unit 410 and/or a whip such as the whip 70 and/or a vibrating head such as the vibrating head 78 may be provided with a work light 478 to illuminate an area of wet concrete in which the vibrating head 78 is immersed. The light 478 may be capable of changing between a spot illumination mode, in which the light generated by the component on which the light 478 are mounted, which may be the portable power unit 410, is cast about a relatively small area, and a flood illumination mode, in which the light generated by the component on which the light 478 are mounted is cast about a relatively large area. The work light 478 may also be deactivated if not needed. In the illustrated embodiment, the remote control 450 includes a light mode selection button 482 that allows a user to switch between the spot illumination mode, the flood illumination mode, and an "off" mode in which some or all lights are deactivated. In other words, in some embodiments, the work light 478 may be coupled to one of the portable power unit 410 or the vibrating head 78, and the remote control 450 may be configured to selectively activate the work light 478. The remote control 450 also includes a brightness control button 486 that allows a user to adjust the brightness of the work light 478 between multiple different levels. For example, the brightness control button 486 may be depressed by a user to sequentially adjust the work light 478 between two or more brightness levels.

The remote control 450 may include an onboard rechargeable power source (i.e., a battery, not shown). As such, the remote control 450 may be charged by connection with a receptacle onboard the portable power unit 410 or another tool with which the battery pack 422 is interchangeable. Alternatively, the remote control 450 may be charged via a USB cable, through an inductive charger, or through another charger with the battery remaining onboard the remote control 450. As a further alternative, the remote control 450 may contain a removable and/or replaceable battery.

With continued reference to FIG. 21, the remote control 450 may communicate with the portable power unit 410 with a wireless communication protocol, such as Bluetooth Low Energy ("BTLE"), standard Bluetooth, radio frequency communication such as 433 MHz, Wi-Fi, infrared, or standard cellular communication frequencies (2G, 3G, 4G, 5G, or LTE services). The remote control 450 may include a transmitter 490 configured to send messages to a receiver 494 on the portable power unit 410. A communications link between the transmitter 490 of the remote control 450 and the receiver 494 of the portable power unit 410 may be established via a Universal Asynchronous Receiver-Transmitter ("UART"), a Serial Peripheral Interface ("SPI"), or a RS485 communications link. Another communications link that may be used includes a hardware link where a signal generated by one of portable power unit 410 or remote control 450 activates a physical switch on the other of the portable power unit 410 and the remote control 450. In other embodiments, the remote control 450 may be a wired communication device receiving power and communicating through a wired connection with the portable power unit 410.

Additionally or alternatively, a signal may be generated by the power PCB 458 and/or the user interface PCB 462 of the portable power unit 410 to indicate the running state (for example, on/off status, direction, and/or speed) of the motor 82. This signal may be sent by a transmitter 498 of the portable power unit 410 and may be received by a receiver 502 of the remote control 450 for communicating the signal to the user via an indicator 506 on the remote control 450. Thus, the indicator 506 may communicate to a user of the portable power unit 410 the running state of a concrete vibrator motor such as the motor 82 (FIG. 5). In the illustrated embodiment, the indicator 506 is an LED configured to illuminate, for example, when the motor 82 is activated. Alternatively or additionally, the indicator 506 may provide an audible or tactile signal to the user.

When using the remote control 450, a first user carrying the portable power unit 410 may be responsible for submerging and moving a vibrating head such as, for example, the vibrating head 78 throughout a region of wet concrete, while a second user may hold the remote control 450 and be responsible for adjusting the frequency of vibration of the vibrating head 78 to account for variations in the consistency of the wet concrete, or to adjust the vibrating head 78 for use with wet concrete in different stages of dryness. In this manner, the user carrying the portable power unit 410 needs only to concentrate on placement of the vibrating head 78 within the wet concrete. Alternatively, the same user responsible for submerging and moving the vibrating head 78 may also hold the remote control 450 and be responsible for adjusting the frequency of the vibrating head 78. This allows a single user to adjust the frequency of vibration of the vibrating head 78 based on tactile feedback from the vibrating head 78 due to the consistency of the wet concrete.

Additionally or alternatively, a single user can operate the portable power unit 410 by submerging the vibrating head 78 in wet concrete and controlling the frequency of vibration of the vibrating head 78 using the remote control 450, all while carrying the portable power unit 410 with, for example, the rigging 190 (FIG. 13).

Figure 22:
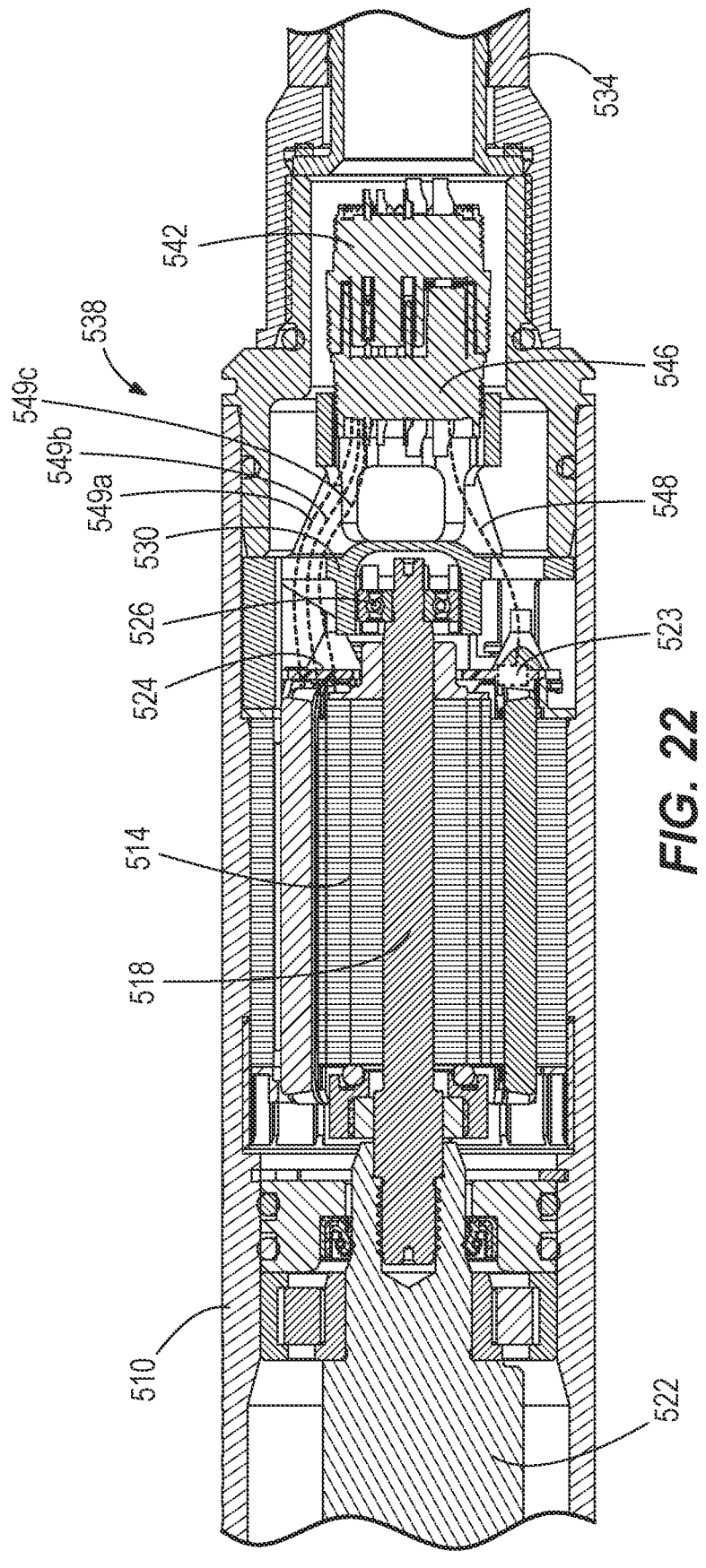
FIG. 22 is a cross-sectional view of a vibrating head of a concrete vibrator.

With reference to FIG. 22, another vibrating head 510 is shown that may be interchangeable with any of the previously described vibrating heads for use with the portable power unit 10, 410. For example, the vibrating head 510 may be used as a high cycle concrete vibrator with the portable power unit 410 and controlled by the motor control unit 430 and further may be controllable via instructions transmitted to and/or from the remote control 450. The vibrating head 510 includes an onboard electric motor 514 that may be a brushless DC motor. The motor 514 may include a rotor shaft 518 that is coupled for corotation with an eccentric mass 522 such that a rotation of the motor 514 induces a vibration in the vibrating head 510, thereby allowing the vibrating head 510 to function as a concrete vibrator. The vibrating head 510 may include a rotational speed sensor 523, such as a Hall-effect sensor or Hall-effect sensor array located on a Hall-effect circuit board 524, for sensing a rotational speed of the rotor shaft 518, and therefore a rotational speed of the motor 514, and transmitting a signal representing the rotational speed of the rotor shaft 518 to the motor control unit 430. The rotor shaft 518 is rotatably supported at or near an end of the rotor shaft 518 by a rotor bearing 526. The bearing 526 may be partially or entirely surrounded and supported by a bearing retainer 530.

With continued reference to FIG. 22, the vibrating head 510 is connectable to an electrical cable 534, which may be called a whip 534, at an electrical connection 538. The whip 534 may transmit electrical current to the motor 514 and may also transmit control signals. The whip 534 may include a bundle of wires (not shown) that are electrically connected to a first electrical connector (i.e., a whip electrical connector 542) that is mounted to the whip 534. The vibrating head 510 includes a second electrical connector (i.e., a vibrating head electrical connector 546) that is selectively electrically connectable to the whip electrical connector 542. The whip electrical connector 542 is electrically connected to the vibrating head electrical connector 546 when the vibrating head 510 is connected to the whip 534. When the vibrating head 510 is disconnected from the whip 534, the electrical connectors 542, 546 are disconnected. The bearing retainer 530 supports the vibrating head electrical connector 546 within the vibrating head 510. In some embodiments, the bearing retainer 530 may function as a stator mount. The bearing retainer 530 may be positioned within the vibrating head 510 between the rotor shaft 518 and the vibrating head electrical connector 546. One of the whip electrical connector 542 or the vibrating head electrical connector 546 may include a male connector, and the other of the whip electrical connector 542 or the vibrating head electrical connector 546 may include a female connector. In some embodiments, each electrical connector 542, 546 may include at least one male and at least one female component. The vibrating head electrical connector 546 may be positioned such that the circuit board 524 is supported at an end of the motor 514 that is proximate the vibrating head electrical connector 546. One or more electrical wires (e.g., one wire, a plurality of wires, or a single multi-conductor cable) such as the electrical wire 548 interconnects the circuit board 524 and the vibrating head electrical connector 546. An output of the sensor 523 may be transmitted through the electrical wire 548 to the second electrical connector 546. One or more commutation wires 549a, 549b, 549c may electrically connect the motor 514 and the vibrating head electrical connector 546, and the commutation wires 549a, 549b, 549c may be routed adjacent to or in a multi-conductor cable with the electrical wire 548. In the illustrated embodiment, three commutation wires 549a, 549b, 549c are provided.

Figure 23:
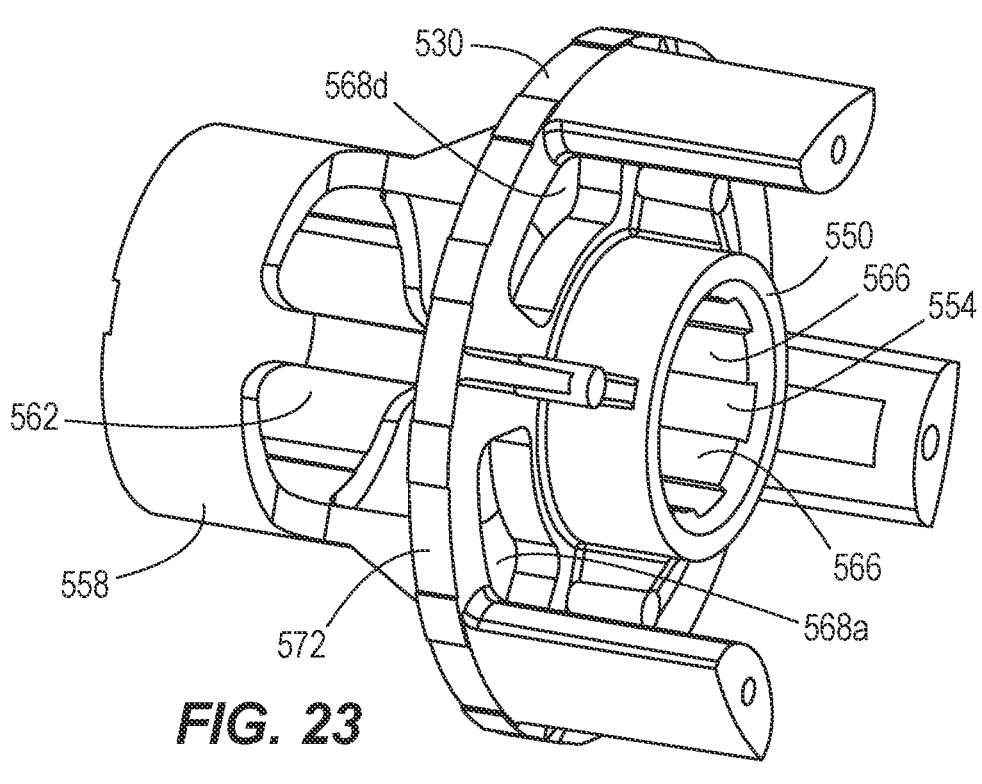
FIG. 23 is a front perspective view of a bearing retainer of the vibrating head of FIG. 22.
Figure 24:
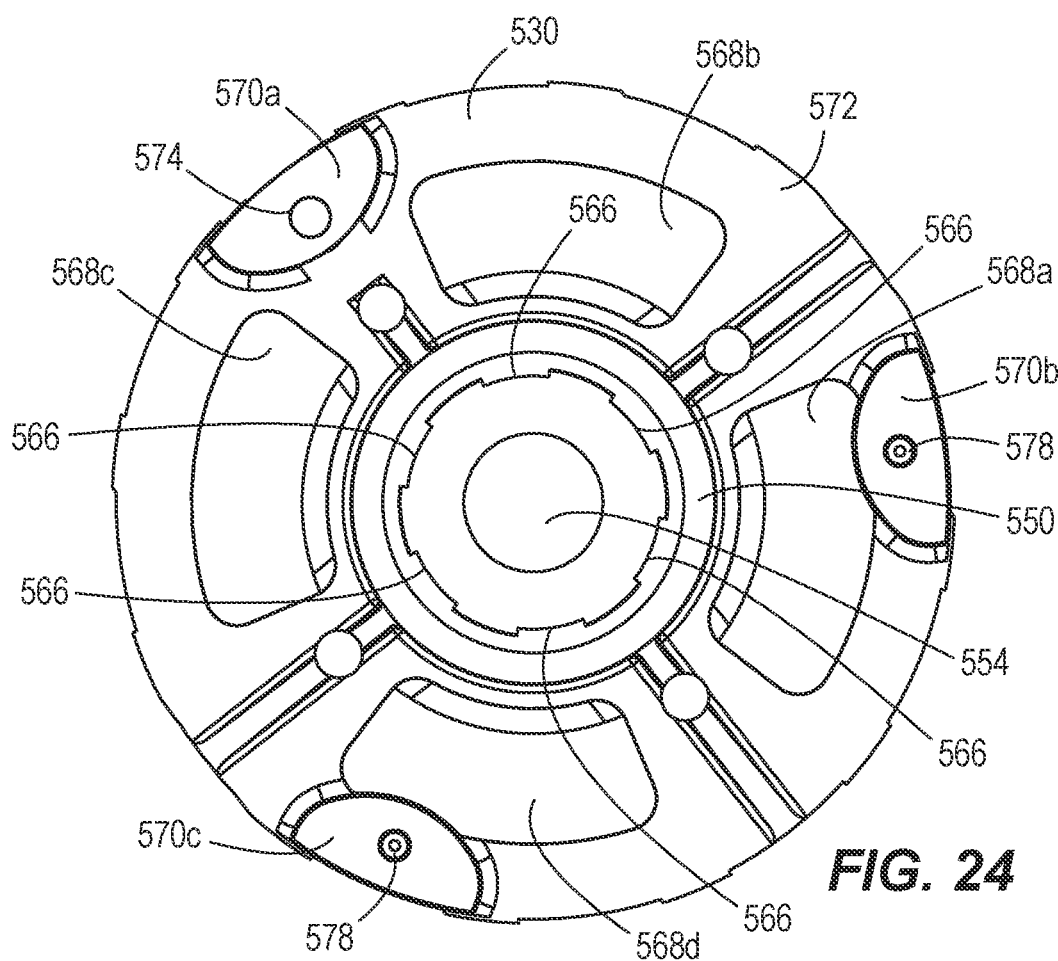
FIG. 24 is a front view of the bearing retainer of FIG. 23.

With reference to FIGS. 23 and 24, the bearing retainer 530 includes a first wall 550 defining a first pocket (i.e., a bearing pocket 554) and a second wall 558 opposite from the bearing pocket 554 and defining a second pocket (i.e., a connector pocket 562). The first wall 550 supports the bearing 526 (FIG. 22), and the second wall 558 supports the vibrating head electrical connector 546. The first wall 550 and/or the bearing pocket 554 may be referred to as a rotor bearing retention portion, and the second wall 558 and/or the connector pocket 562 may be referred to as a connector retention portion. Inwardly extending protrusions 566 within the first wall 550 provide a press-fit connection with an outside diameter of the bearing 526. The flange 572 may include one or more, and in the illustrated embodiment includes four, openings 568a, 568b, 568c, 568d through which the electrical wire 548 and/or the commutation wires 549a, 549b, 549c may be routed to electrically connect the circuit board 524 and the vibrating head electrical connector 546 and/or to electrically connect the motor 514 and the vibrating head electrical connector 546. More specifically, the commutation wires 549a, 549b, 549c may electrically connect windings of the motor 514 and the vibrating head electrical connector 546. In some embodiments, the electrical wire 548 and the one or more commutation wires 549a, 549b, 549c are routed through the same opening 568a, 568b, 568c, 568d, and in other embodiments, the electrical wire 548 and the one or more commutation wires 549a, 549b, 549c are routed through different openings 568a, 568b, 568c, 568d. Further, the bearing retainer 530 includes three positioning fingers 570a, 570b, 570c that rotationally constrain the bearing retainer 530 within the vibrating head 510. The positioning fingers 570a, 570b, 570c may engage with a housing of the vibrating head 510 (see, e.g., the housing 110 of FIG. 5) to support the bearing retainer 530 within the housing. In other embodiments, more or fewer positioning fingers 570a, 570b, 570c may be used. The positioning fingers 570a, 570b, 570c may be equidistantly spaced apart about a flange 572 and may axially extend from the flange 572. The flange 572 may extend radially outward from the bearing pocket 554.

Figures 25, 26:
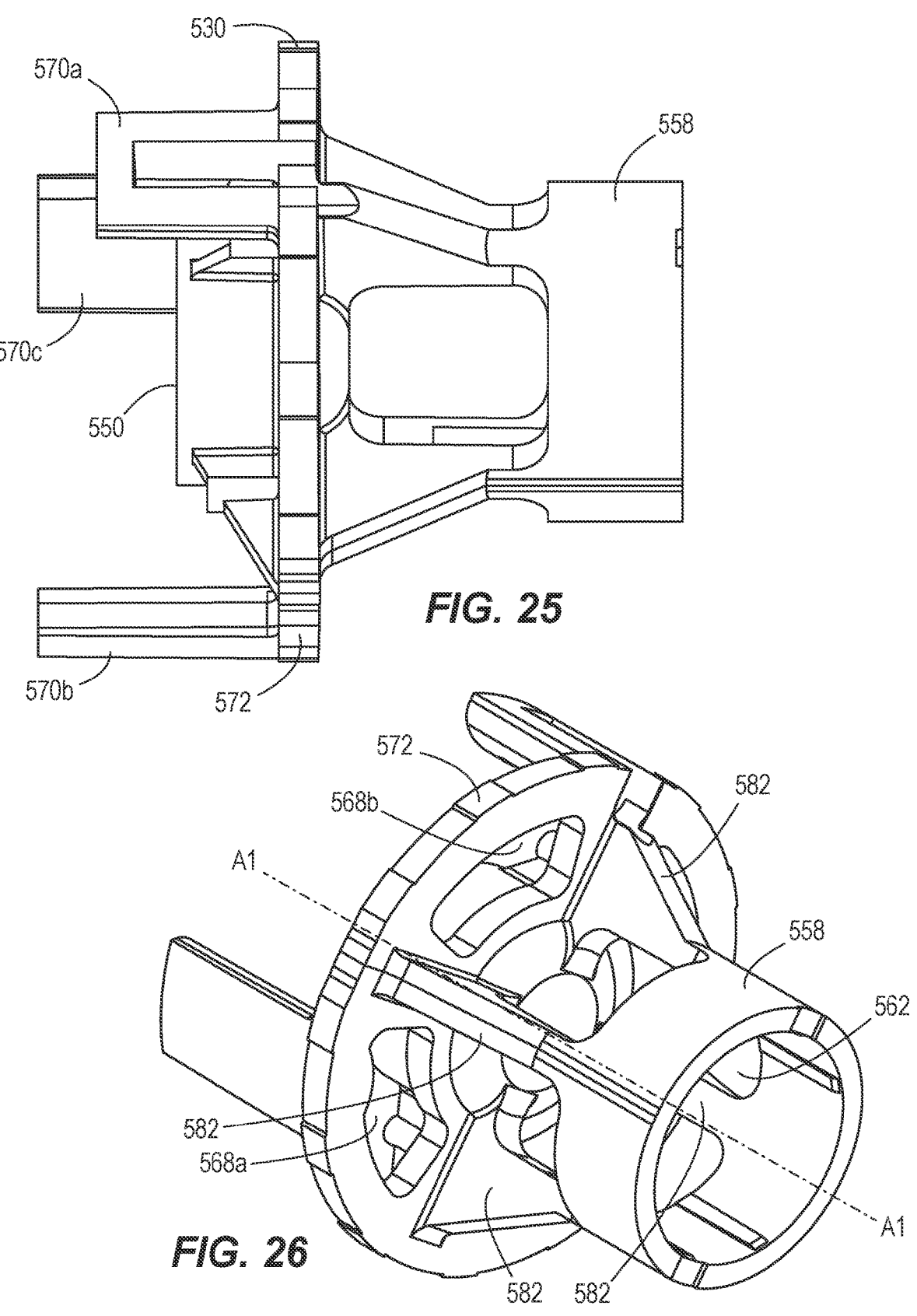
FIG. 25 is a side view of the bearing retainer of FIG. 23.
FIG. 26 is a rear perspective view of the bearing retainer of FIG. 23.

With reference to FIG. 25, one of the positioning fingers 570a may be shorter than the other of the positioning fingers 570b, 570c. Further, one of the positioning fingers 570a, 570b, 570c, and in the illustrated embodiment, the positioning finger 570a, may include a through hole 574 (FIG. 24). The through hole 574 may have an axis that is parallel to a rotational axis of the rotor shaft 518. Certain positioning fingers 570a, 570b, 570c, and in the illustrated embodiment the positioning fingers 570b, 570c, may include blind holes 578 that are parallel or substantially parallel to the axis of the through hole 574.

Figure 27:
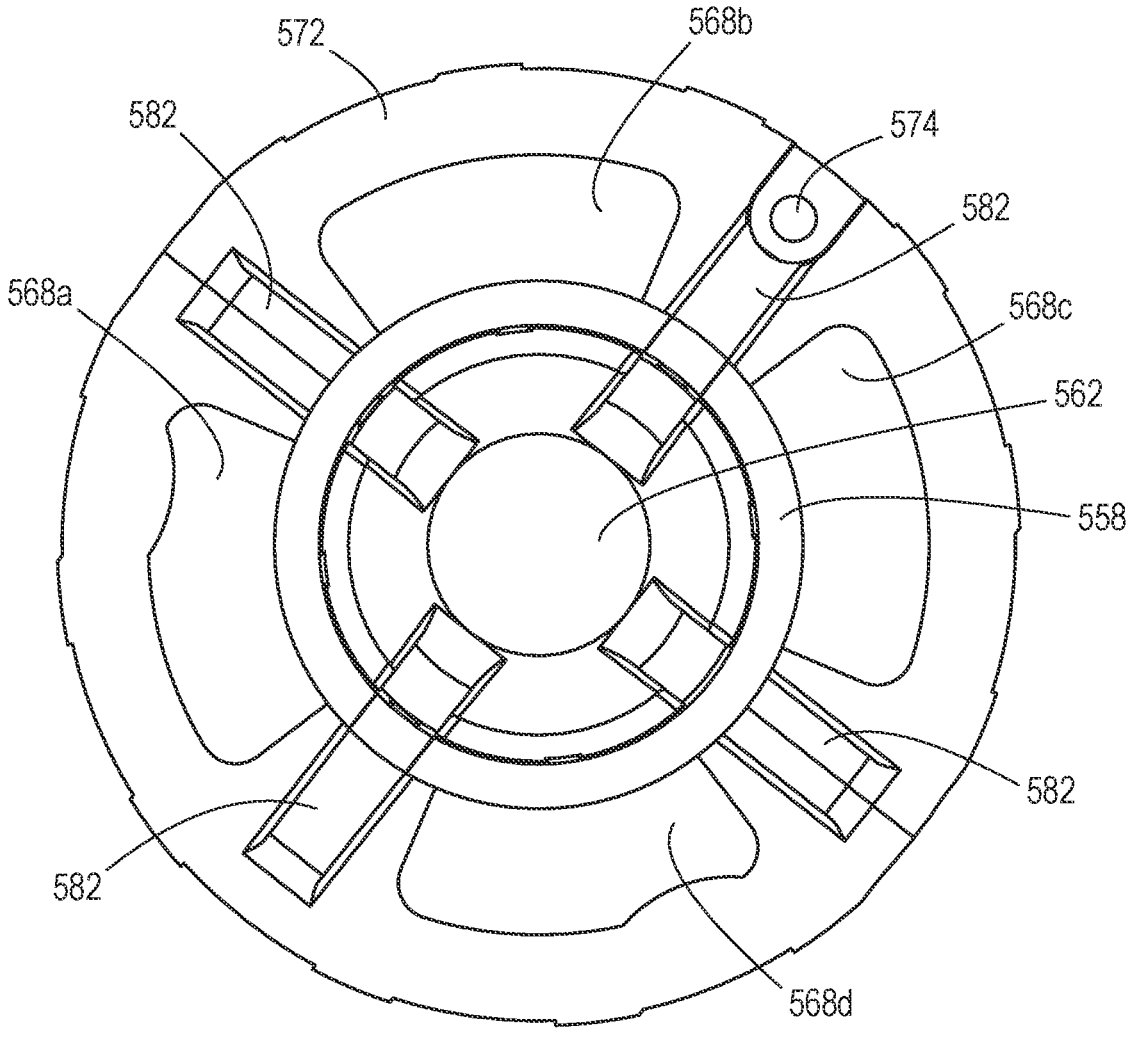
FIG. 27 is a rear view of the bearing retainer of FIG. 23.

With reference to FIGS. 26 and 27, the bearing retainer 530 includes a longitudinal axis A1. The longitudinal axis A1 may pass through a center of the bearing pocket 554, and the longitudinal axis A1 may pass through a center of the connector pocket 562. In the illustrated embodiment, the longitudinal axis A1 passes through both the center of the bearing pocket 554 as well as the center of the connector pocket 562. Further, the longitudinal axis A1 may be parallel to and/or collinear with the longitudinal axis of the rotor shaft 518 when the bearing retainer 530 is installed within the vibrating head 510. In the illustrated embodiment, the second wall 558 is supported in an axial direction of the longitudinal axis A1 away from the flange 572 by four axial supports 582. In other embodiments, the number of axial supports may be zero, one, two, three, five, or another number. In the illustrated embodiment, the bearing retainer 530 is configured to support the bearing 526 and the vibrating head electrical connector 546 in an electrical assembly pertaining to a concrete vibrator. In other embodiments, a bearing retainer such as the illustrated bearing retainer 530 may be used in an electrical assembly pertaining to other applications involving electric motors of various sizes such as, for example, electric motors in portable power tools such as drills, saws, etc. as well as in stationary electric motors.

Figure 28:
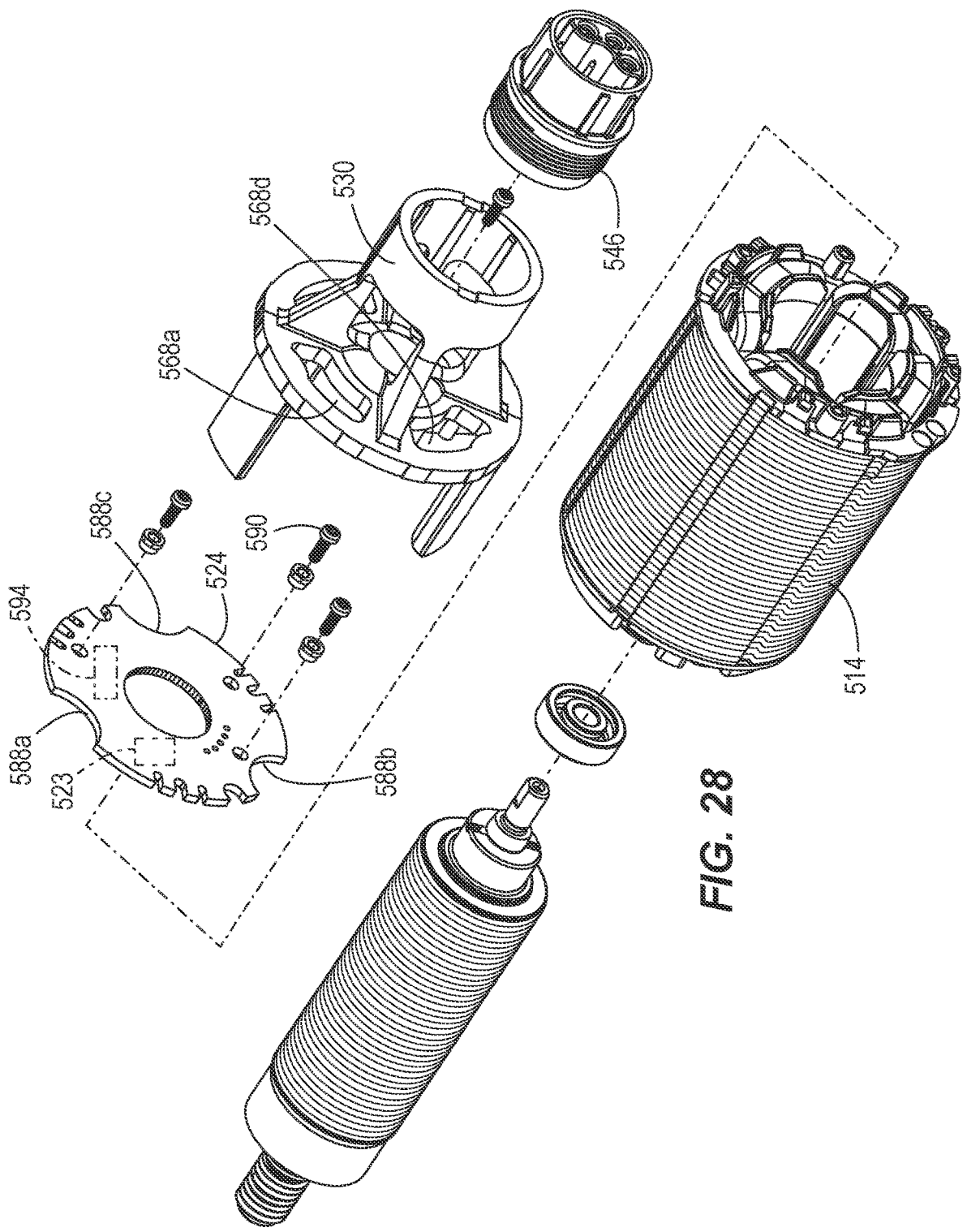
FIG. 28 is a partial exploded view of the vibrating head of FIG. 22.

With reference to FIG. 28, the Hall-effect board 524 may be fastened to an inside of the vibrating head 510 by means of fasteners 590. The Hall-effect board 524 may be a rotational speed-sensing PCB 524. The Hall-effect board 524 may include notches 588a, 588b, 588c that are spaced, and in some embodiments equidistantly spaced, about a periphery of the Hall-effect board 524. Each notch 588a, 588b, 588c may be configured to respectively receive one of the three positioning fingers 570a, 570b, 570c (FIG. 25). A temperature sensor such as a thermistor 594 may be located on the Hall-effect board 524. The thermistor 594 measures an air temperature within the vibrating head 510. The thermistor 594 sends a signal that is representative of the air temperature within the vibrating head 510 to at least one of the power PCB 458 and/or the user interface PCB 462 in the motor control unit 430. The power PCB 458 and/or the user interface PCB 462 may operate to compare the air temperature as measured by the thermistor 594 to a desired air temperature or range of air temperatures. Further, the power PCB 458 and/or the user interface PCB 462 may correlate the air temperature as measured by the thermistor 594 to a core or coil temperature of the motor 514. In other words, the thermistor 594 may detect a temperature of the motor 514. In some embodiments, a desired core or coil temperature of the motor 514 may be below 180 degrees Celsius, for example. In other embodiments, for example, a desired core or coil temperature of the motor 514 may be below 170 degrees Celsius, below 150 degrees Celsius, below 130 degrees Celsius, or below 110 degrees Celsius. Further, a desired core or coil temperature of the motor 514 may be above, for example, 0 degrees Celsius, −20 degrees Celsius, etc.

Figure 29:
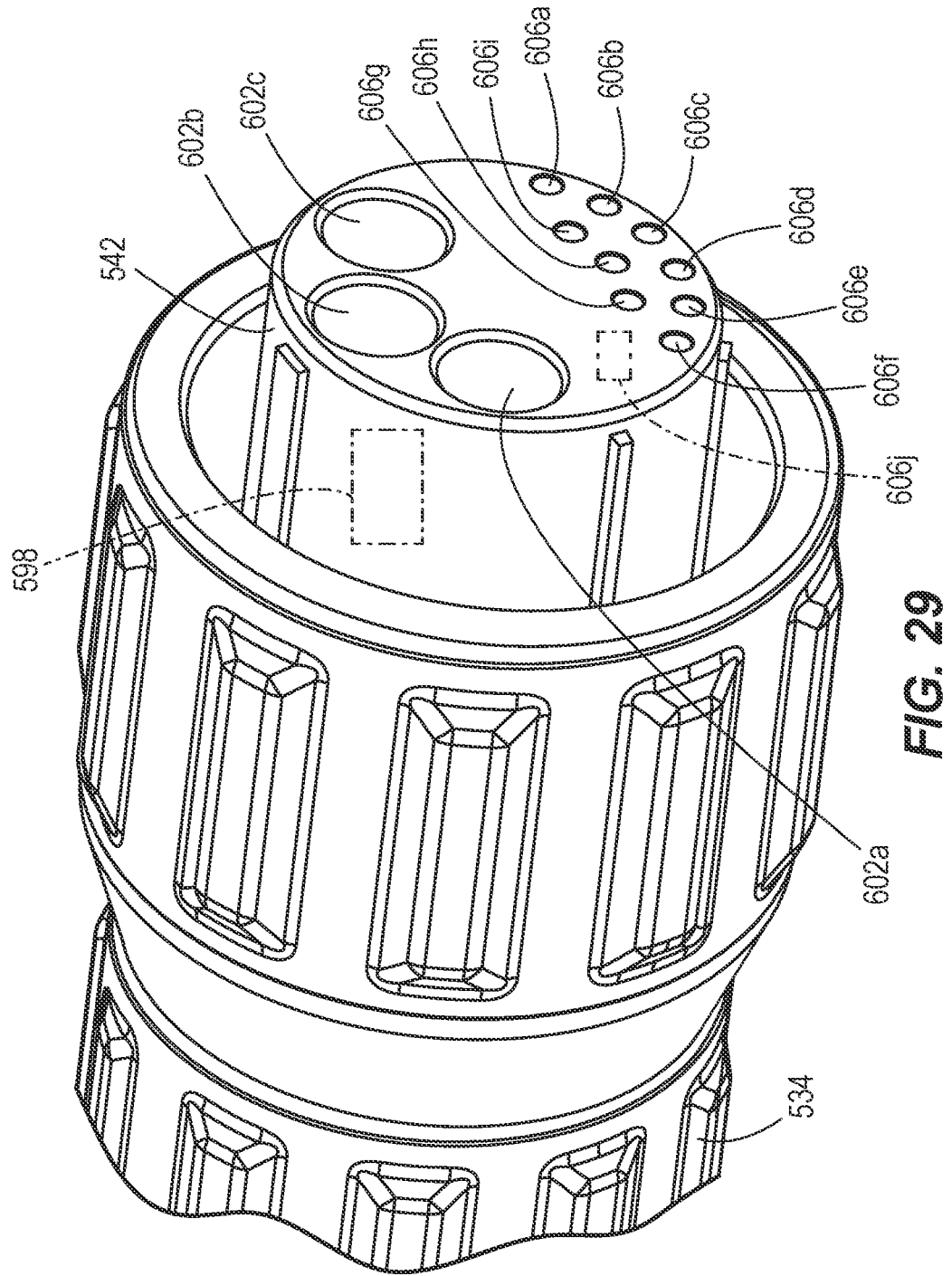
FIG. 29 is a perspective view of an end of an electrical cable that couples to the vibrating head of FIG. 22.

With reference to FIG. 29, a thermistor 598 may be located on a part of the cable 534 or whip 534. In some embodiments, a thermistor such as one of the thermistors 594, 598 may be located on the motor. For example, the thermistor 598 may be located, in some embodiments, on an end of the whip 534 such as on the whip electrical connector 542. The thermistor 598 may function similarly to the thermistor 594 to communicate signals that represent an air temperature to the power PCB 458 and/or the user interface PCB 462. The power PCB 458 and/or the user interface PCB 462 may evaluate the signal delivered by the thermistor 598 alone or in combination with the signal from the thermistor 594. In other embodiments, more than two thermistors are provided or only a single thermistor is provided. In some embodiments, the thermistors may be positioned at different locations on the vibrating head 510 and/or on the whip 534. In response to the temperature signals from the thermistors 594, 598, the power PCB 458 and/or the user interface PCB 462 may control the motor 514 to cease or to otherwise alter the operation of the motor 514 in response to the temperature signals provided by the thermistors 594, 598. In other words, the power PCB 458 and/or the user interface PCB 462 may cause the motor 514 to shut off if a temperature measured by the thermistor 594 and/or the thermistor 598 is outside of a desired temperature range. In some embodiments, the power PCB 458 and/or the user interface PCB 462 may cause the motor 514 to shut off if a temperature measured by the thermistor 594 and/or the thermistor 598 is outside of a desired temperature range for a certain (for example, a predetermined) period of time. In another aspect, the portable power unit 410 may be configured to deactivate the motor 514 in response to the temperature of the motor 514 exceeding a threshold temperature and/or in response to the temperature of the motor 514 being below a threshold temperature.

With continued reference to FIG. 29, the whip electrical connector 542 may include a plurality and, in the illustrated embodiment three, commutation terminals 602a, 602b, 602c, each for receiving a pin on another connector such as, for example, the vibrating head electrical connector 546. The commutation terminals 602a, 602b, 602c may be electrically connected with windings of the motor 514 by the commutation wires 549a, 549b, 549c. The whip electrical connector 542 may further include, for example, nine ports 606a, 606b, 606c, 606d, 606e, 606f, 606g, 606h, 606i, each for receiving a pin on another connector. One or more of the ports 602a, 602b, 602c, 606a, 606b, 606c, 606d, 606e, 606f, 606g, 606h, 606i may be configured for transmitting the signals from the thermistors 594, 598 to the power PCB 458 and/or to the user interface PCB 462. In some embodiments, one or more additional ports 606j may be provided on the whip electrical connector 542 in order to transmit the signals from the thermistors 594, 598 and/or from the sensor 523 to the power PCB 458 and/or to the user interface PCB 462. In some embodiments, one or more of the ports 602a, 602b, 602c, 606a, 606b, 606c, 606d, 606e, 606f, 606g, 606h, 606i may be used to transmit the signals from the thermistors 594, 598 and/or from the sensor 523 to the power PCB 458 and/or to the user interface PCB 462. Other pins and ports may be provided on other connectors for a similar purpose.

Figure 30:
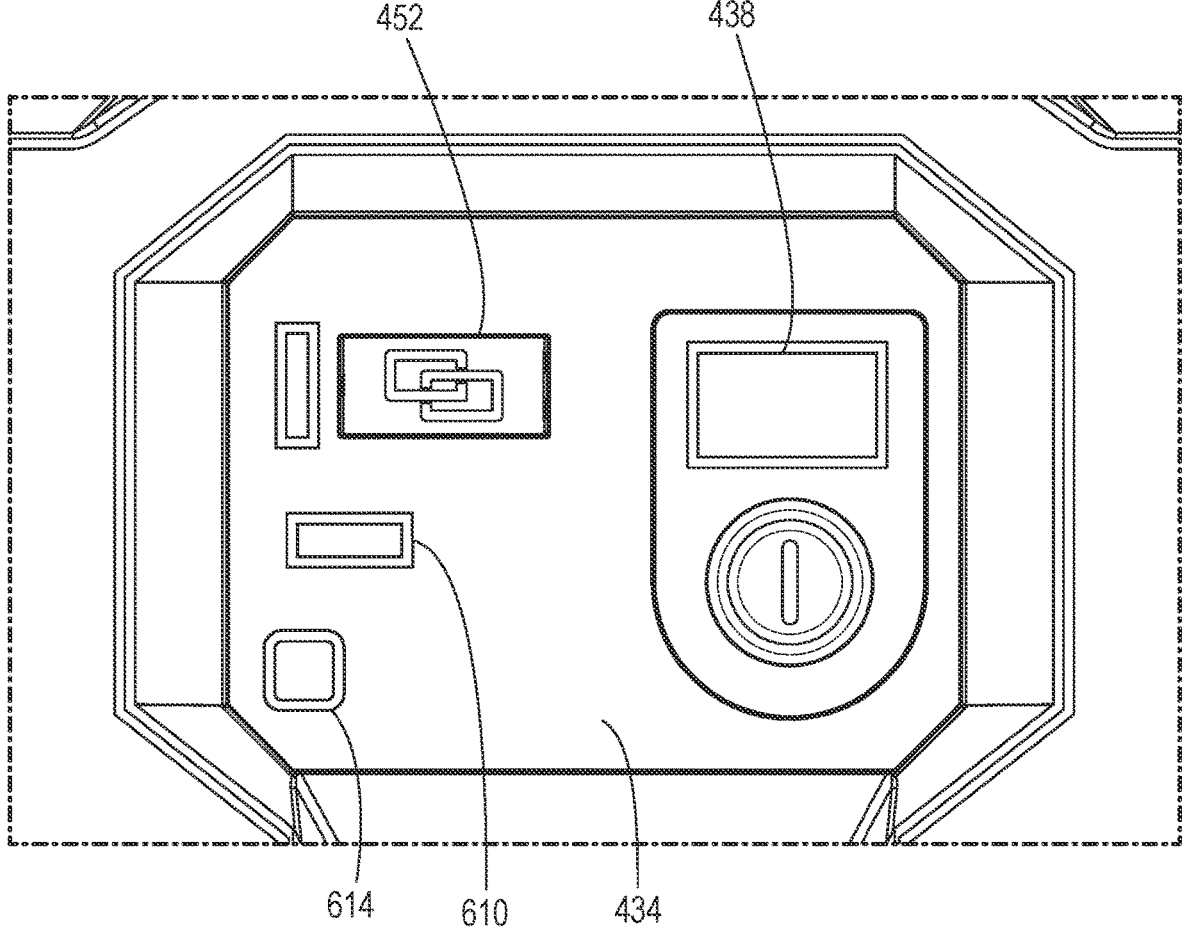
FIG. 30 is a front view of a control panel of the portable power unit of FIG. 15.

With reference to FIG. 30, the control panel 434 includes the on/off switch 438 (FIG. 15), the remote pairing button 452, a warning light 610, and an authentication scanner 614. The warning light 610 may function as a speed warning light 610 and may illuminate in a fashion determined by the power PCB 458 and/or the user interface PCB 462. For example, the power PCB 458 and/or the user interface PCB 462 receives a speed signal from a sensor such as, for example, the Hall-effect board 524. The speed signal may represent a rotational speed of the motor 514. The speed warning light 610 may illuminate when the motor 514 is operating at a rotational speed that is outside of a desired range. For example, the speed warning light 610 may illuminate when the motor 514 is operating at a rotational speed of less than, for example, 10,000 RPM. The speed warning light 610 may illuminate when the motor 514 is operating at a rotational speed of less than another rotational speed that may be predetermined and/or when the motor 514 is operating at a rotational speed of greater than another rotational speed that may be predetermined. The warning light 610 may also function to enable a user to monitor the rotational speed of the motor during various conditions such as, for example, startup during relatively cold conditions. The warning light 610 may also indicate to the user that the motor 514 is operating at a temperature outside of a desired temperature range. Therefore, the warning light 610 may be controlled by the power PCB 458 and/or the user interface PCB 462 based at least in part on temperature signals received from the thermistor 594 and/or the thermistor 598. To indicate that the motor 514 is operating at a temperature that is too hot or too cold, the warning light 610 may flash.

With continued reference to FIG. 30, the authentication scanner 614 may read an identification device, such as an RFID card, carried by the user. In some embodiments, the portable power unit 410 may be configured such that the portable power unit 410 is not operable (or is partially inoperable) until the identification device carried by the user is scanned by the authentication scanner 614.

Any of the portable concrete vibrators disclosed herein may be operable with any of the portable power units disclosed herein.

Functions performed by controllers such as printed circuit boards may be performed by controllers of other types and, in some embodiments, may be performed by a single controller or by multiple controllers.

Although the invention has been described in detail with reference to certain preferred embodiments, variations and modifications exist within the scope and spirit of one or more independent aspects of the invention as described.

Various features of the invention are set forth in the following claims.

What is claimed is:

1. A concrete vibrator system comprising:

a vibrating head including a shaft having a center of mass radially offset from a rotational axis of the shaft and an onboard electric motor configured to provide torque to the shaft, causing the shaft to rotate;

a portable power unit including a battery pack configured to provide electrical current to the motor; and a cable extending between the portable power unit and the vibrating head, the cable being configured to transmit electrical current from the battery pack to the motor and a motor control signal from the portable power unit to the motor, wherein the vibrating head is a first vibrating head, the first vibrating head being detachable from the portable power unit and replaceable with a second vibrating head, and wherein the first vibrating head has a first diameter and the second vibrating head has a second diameter, the first diameter being different from the second diameter.

2. The concrete vibrator system of claim 1, wherein the portable power unit includes a battery receptacle unit to which the battery pack is removably coupled and a motor control unit configured to transmit the motor control signal to the motor.

3. The concrete vibrator system of claim 2, wherein the motor control unit is removable from the battery receptacle unit.

4. The concrete vibrator system of claim 3, wherein the motor control unit is coupled to the battery receptacle unit via a plurality of latches.

5. The concrete vibrator system of claim 4, wherein each latch includes at least one hook and at least one projection, and wherein the at least one hook is on the battery receptacle unit and the at least one projection is on the motor control unit.

6. The concrete vibrator system of claim 4, wherein the motor control unit includes a first electrical connection configured to selectively electrically couple the cable to the motor control unit.

7. The concrete vibrator system of claim 6, wherein the motor control unit includes a second electrical connection configured to selectively electrically couple the motor control unit to the battery receptacle unit.

8. The concrete vibrator system of claim 3, wherein the motor control unit is coupled to the battery receptacle unit via a sub-flush electronics connection.

9. The concrete vibrator system of claim 8, wherein the sub-flush electronics connection is an interface between a male protrusion on the motor control unit and a female recess within the battery receptacle unit.

10. The concrete vibrator system of claim 9, wherein a plurality of bolts attaches the motor control unit to the battery receptacle unit.

11. The concrete vibrator system of claim 10, wherein the battery receptacle unit includes a plurality of first bores and a plurality of threaded inserts respectively provided within the plurality of first bores, and wherein each of the plurality of bolts threads into one of the plurality of threaded inserts.

12. The concrete vibrator system of claim 11, wherein the motor control unit includes at least one protruding ear, and wherein the at least one protruding ear includes at least one second bore.

13. The concrete vibrator system of claim 12, wherein at least one of the plurality of bolts passes through the at least one second bore.

14. The concrete vibrator system of claim 2, wherein the battery receptacle unit and the motor control unit are integrated in a common housing.

15. The concrete vibrator system of claim 2, further comprising a remote control configured to communicate with the motor control unit and prompt the motor control unit to transmit the motor control signal to the motor.

16. The concrete vibrator system of claim 15, wherein, in addition to the remote control, the portable power unit includes a user interface on a housing with which a user may prompt the motor control unit to transmit the motor control signal to the motor.

17. The concrete vibrator system of claim 16, wherein both the remote control and the user interface are operable to prompt the motor control unit to vary a rotational speed of the motor.

18. The concrete vibrator system of claim 15, further comprising a work light coupled to one of the portable power unit or the vibrating head, wherein the remote control is configured to selectively activate the work light.

19. The concrete vibrator system of claim 1, further comprising a backpack to which the portable power unit is attached to facilitate transport of the portable power unit while the vibrating head is in use.

20. The concrete vibrator system of claim 1, further comprising a temperature sensor configured to detect a temperature of the motor.

21. The concrete vibrator system of claim 20, wherein the temperature sensor is located on one of the motor or the cable.

22. The concrete vibrator system of claim 20, wherein the portable power unit is configured to deactivate the motor in response to the temperature of the motor exceeding a threshold temperature.

23. The concrete vibrator system of claim 1, wherein the battery pack has a nominal voltage of up to about 80 V.

24. A concrete vibrator system comprising:

a vibrating head including a shaft having a center of mass radially offset from a rotational axis of the shaft and an onboard electric motor configured to provide torque to the shaft, causing the shaft to rotate;

a portable power unit including a battery pack configured to provide electrical current to the motor; and a cable extending between the portable power unit and the vibrating head, the cable being configured to transmit electrical current from the battery pack to the motor and a motor control signal from the portable power unit to the motor, wherein the portable power unit includes a battery receptacle unit to which the battery pack is removably coupled and a motor control unit configured to transmit the motor control signal to the motor, wherein the motor control unit is removable from the battery receptacle unit, wherein the motor control unit is coupled to the battery receptacle unit via a plurality of latches, wherein each latch includes at least one hook and at least one projection, and wherein the at least one hook is on the battery receptacle unit and the at least one projection is on the motor control unit.

25. A concrete vibrator system comprising:

a vibrating head including a shaft having a center of mass radially offset from a rotational axis of the shaft and an onboard electric motor configured to provide torque to the shaft, causing the shaft to rotate;

a portable power unit including a battery pack configured to provide electrical current to the motor; and a cable extending between the portable power unit and the vibrating head, the cable being configured to transmit electrical current from the battery pack to the motor and a motor control signal from the portable power unit to the motor, wherein the portable power unit includes a battery receptacle unit to which the battery pack is removably coupled and a motor control unit configured to transmit the motor control signal to the motor, wherein the motor control unit is removable from the battery receptacle unit, wherein the motor control unit is coupled to the battery receptacle unit via a sub-flush electronics connection, wherein the sub-flush electronics connection is an interface between a male protrusion on the motor control unit and a female recess within the battery receptacle unit, wherein a plurality of bolts attaches the motor control unit to the battery receptacle unit, wherein the battery receptacle unit includes a plurality of first bores and a plurality of threaded inserts respectively provided within the plurality of first bores, and wherein each of the plurality of bolts threads into one of the plurality of threaded inserts.

* * * * *